US007878659B2

(12) United States Patent
Kadowaki et al.

(10) Patent No.: US 7,878,659 B2
(45) Date of Patent: Feb. 1, 2011

(54) ILLUMINATION OPTICAL SYSTEM AND PROJECTION-TYPE IMAGE DISPLAY APPARATUS USING THE SAME

(75) Inventors: Ryota Kadowaki, Utsunomiya (JP); Yu Yamauchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 400 days.

(21) Appl. No.: 12/145,399

(22) Filed: Jun. 24, 2008

(65) Prior Publication Data

US 2009/0002634 A1    Jan. 1, 2009

(30) Foreign Application Priority Data

Jun. 26, 2007    (JP) .............................. 2007-167476

(51) Int. Cl.
*G03B 21/14* (2006.01)

(52) U.S. Cl. ........................................ 353/38; 359/619

(58) Field of Classification Search ................... 353/33, 353/38; 359/619, 621

See application file for complete search history.

(56) References Cited

U.S. PATENT DOCUMENTS

| 6,246,526 | B1 * | 6/2001 | Okuyama | 359/621 |
|---|---|---|---|---|
| 6,257,726 | B1 * | 7/2001 | Okuyama | 353/20 |
| 6,273,569 | B1 * | 8/2001 | Iechika et al. | 353/38 |
| 6,633,435 | B2 * | 10/2003 | Akiyama et al. | 359/619 |
| 6,860,607 | B2 * | 3/2005 | Yanagisawa | 353/38 |
| 2002/0008910 | A1 * | 1/2002 | Akiyama et al. | 359/499 |
| 2005/0134812 | A1 | 6/2005 | Akiyama | |
| 2007/0024977 | A1 | 2/2007 | Kawamura et al. | |
| 2007/0296926 | A1 * | 12/2007 | Takauchi et al. | 353/38 |

FOREIGN PATENT DOCUMENTS

| EP | 633702 A1 | 1/1995 |
|---|---|---|
| EP | 1542459 A2 | 6/2005 |
| JP | 06-75200 A | 3/1994 |
| JP | 2000-206463 A | 7/2000 |
| WO | 97/37266 | 10/1997 |

* cited by examiner

*Primary Examiner*—Georgia Y Epps
*Assistant Examiner*—Bao-Luan Le
(74) *Attorney, Agent, or Firm*—Canon U.S.A., Inc. I.P. Division

(57) ABSTRACT

An illumination optical system configured to guide a light flux from a light source unit onto an illuminated surface includes a compression system configured to compress the light flux at a different compression ratio in a first cross section and a second cross section which are orthogonal to each other, and a polarized light splitting unit including a polarization split surface. The second cross section includes a line normal to the polarization split surface. Where a compression ratio for compressing a light flux in the first cross section is α, a compression ratio in the second cross section is β, and an F number smaller of F numbers calculated according to a maximum angle of a light flux incident on an illuminated surface in the first and the second cross sections is Fno, the following conditions are satisfied:

$-0.18*(Fno)+1.245*(Fno)-1.260 < \alpha/\beta < 1$
$1.4 \leq Fno \leq 3.6$.

10 Claims, 24 Drawing Sheets

<X-Z CROSS SECTION>

<Y-Z CROSS SECTION>

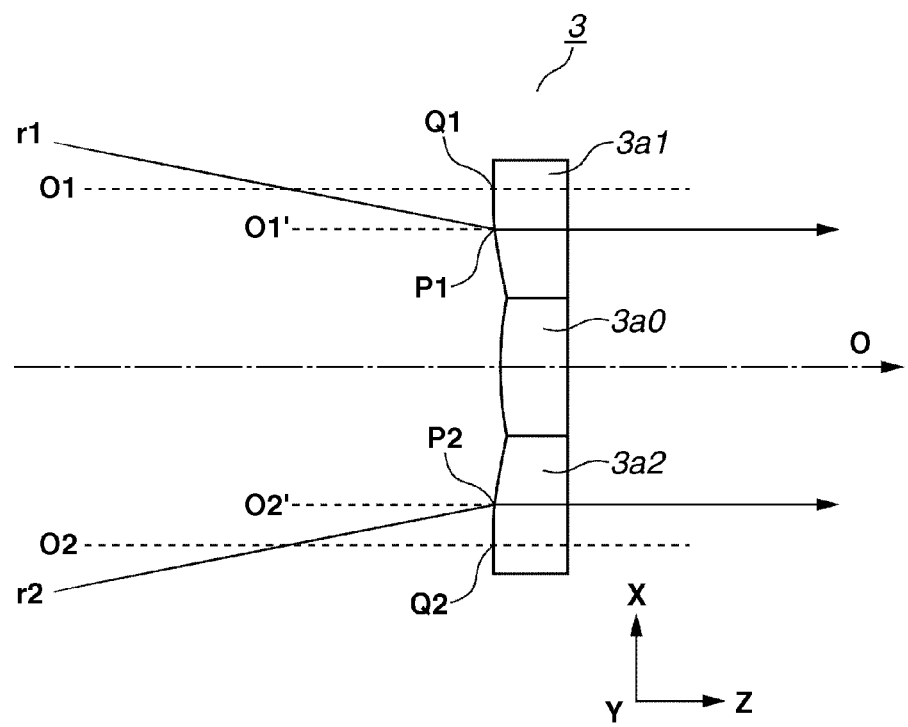
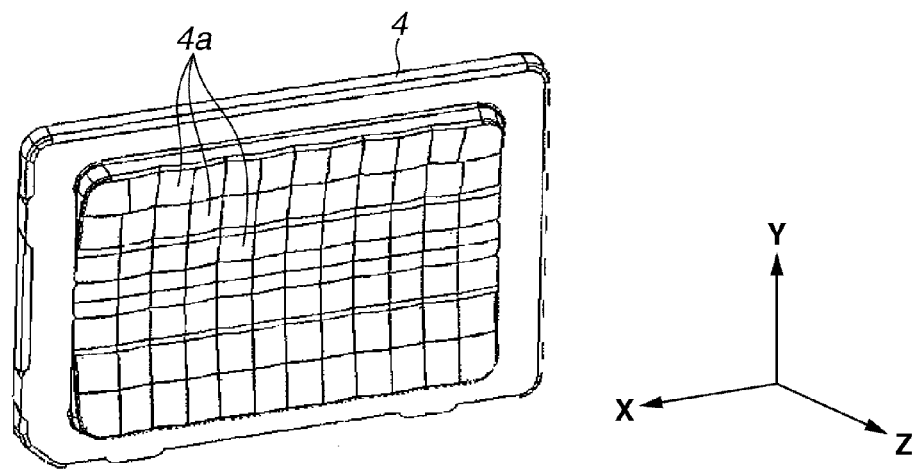

<X-Z CROSS SECTION>

<Y-Z CROSS SECTION>

<X-Z CROSS SECTION>

<Y-Z CROSS SECTION>

<X-Z CROSS SECTION>

<Y-Z CROSS SECTION>

<X-Z CROSS SECTION>

<Y-Z CROSS SECTION>

<X-Z CROSS SECTION>

<Y-Z CROSS SECTION>

<X-Z CROSS SECTION>

<Y-Z CROSS SECTION>

<X-Z CROSS SECTION>

<Y-Z CROSS SECTION>

\<X-Z CROSS SECTION\>

\<Y-Z CROSS SECTION\>

<Y-Z CROSS SECTION>

ILLUMINATION OPTICAL SYSTEM AND PROJECTION-TYPE IMAGE DISPLAY APPARATUS USING THE SAME

BACKGROUND OF THE INVENTION

1. Field of the invention

The present invention relates to an illumination optical system configured to illuminate a surface with a light flux from a light source unit. More specifically, the present invention relates to a projection-type image display apparatus (a liquid crystal projector, for example) configured to illuminate an image display element such as a liquid crystal panel provided on an illuminated surface, using the illumination optical system, and to project light from the image display element onto a projection surface such as a screen.

2. Description of the Related Art

Various types of conventional projectors use a projection lens to magnify and project onto a screen a light flux that has been modulated according to image information using an image display element such as a liquid crystal display element. With respect to a projector like this, it is strongly desired that an image projected on a screen has a nearly uniform brightness over the entire image.

A conventional image projection-type illumination optical system (that uses a reflection type liquid crystal display element) emits a light flux from its light source unit as a substantially parallel light reflected by a parabolic reflector. The parallel light flux is split and condensed in a first lens array. Each split light flux is condensed in the proximity of a second lens array to form a light source unit image (secondary light source image). A lens that constitutes each lens array has a rectangular shape similar to a liquid crystal panel, which is an illuminated surface.

A plurality of split light fluxes that has exited from the second lens array is condensed by a condenser lens and is superimposed on a liquid crystal display element via a color separating/combining optical system to illuminate the liquid crystal display element.

An optical element (a dichroic prism or a polarizing beam splitter) including a dichroic film and a polarizing splitting film is used in a color separating/combining optical system.

In order to increase the light utilization efficiency in an illumination optical system like this, an angular distribution of a light flux which is incident on an illuminated surface generally becomes large. Accordingly, various kinds of problems may occur in the case where an optical element having a sensitive angular characteristic is used in an illumination optical system.

For example, an optical element such as a polarizing splitting film (a polarizing beam splitter) may be used in an illumination optical system. When a light flux is incident on a polarizing splitting film, an angular characteristic of the optical element receiving the light flux incident on the polarizing splitting film having an incidence angle of 47 to 49 degrees is lower than the optical element receiving a light flux incident on the polarizing splitting film having an angle of 45 degrees. As a deviation of an incidence angle from the particular angle of 45 degrees becomes larger, the characteristic gets more severely degraded. The degradation of the characteristic may cause the phenomenon of leaking light, which may cause degradation of image quality.

Japanese Patent Application Laid-Open No. 2000-206463 and Japanese Patent Application Laid-Open No. 06-75200 discuss an illumination optical system that uses an asymmetrical optical element whose angular distribution is relatively small in a direction in which the optical element is sensitive to the angular distribution and relatively large in a direction in which the optical element is insensitive to the angular distribution.

In a reflection type liquid crystal projector as discussed in Japanese Patent Application Laid-Open No. 2000-206463, an outer dimension of an aperture stop is smaller in a direction in which an optical element is sensitive to an angular distribution of a light flux and larger in a direction in which an optical element is insensitive to an angular distribution of a light flux.

In the illumination optical system discussed in Japanese Patent Application Laid-Open No. 2000-206463, a second fly-eye lens provided in an illumination optical system has an asymmetrical outer shape (dimension) because the second fly-eye lens substantially functions as an aperture stop. In such a second fly-eye lens, the angular distribution of a light flux incident on the optical element is asymmetrical with respect to a direction sensitive to the angular distribution and a direction insensitive to the angular distribution However, in the optical system discussed in Japanese Patent Application Laid-Open No. 2000-206463, a large amount of brightness tends to be lost because an angle of incidence is determined according to a stop.

In an illumination optical system discussed in Japanese Patent Application Laid-Open No. 06-75200, a condenser lens condenses a light flux immediately before a liquid crystal panel. Accordingly, the degradation of image quality cannot be prevented, which may occur due to an optical element disposed behind the condenser lens that has a high sensitivity to an angular distribution, such as the liquid crystal panel or a dichroic mirror. Consequently, the distribution of illuminated light flux on the liquid crystal panel may vary, which may bring about an uneven brightness of an image projected onto a projection screen.

SUMMARY OF THE INVENTION

The present invention is directed to an illumination optical system capable of uniformly illuminating an image display element at a high brightness level, while maintaining a small angular distribution in a cross section of an optical element in which an angular distribution of the optical element is sensitive. The present invention is also directed to a projection-type image display apparatus capable of projecting an image having high contrast and high brightness using the illumination optical system.

According to an aspect of the present invention, an illumination optical system configured to guide a light flux from a light source unit onto an illuminated surface, the illumination optical system includes a compression system configured to compress the light flux emitted from the light source unit at a different compression ratio in a first cross section plane and a second cross section plane which are orthogonal to each other, and which both include an optical axis of the illumination optical system, and a polarized light splitting unit including a polarization splitting surface, wherein the second cross section plane is a plane including both the normal to the polarization splitting surface, and wherein the following conditions are satisfied:

$$-0.18*(Fno)+1.245*(Fno)-1.260 < \alpha/\beta < 1$$
$$1.4 \leq Fno \leq 3.6,$$

where $\alpha$ and $\beta$ are compression ratios for compressing a light flux in the first cross section plane and in the second cross section plane respectively, and Fno is the smaller of the two F numbers calculated according to a maximum angle of a light flux incident on an illuminated surface in the first and the second cross section planes.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 5 illustrates an example of an optical effect of the first fly-eye lens illustrated in FIG. 4 according to the first exemplary embodiment of the present invention.

FIG. 6 illustrates an example of a second fly-eye lens according to the first exemplary embodiment of the present invention.

DETAILED DESCRIPTION OF THE EMBODIMENTS

Various exemplary embodiments, features, and aspects of the present invention will now be described in detail with reference to the drawings. It is to be noted that the relative arrangement of the components, the numerical expressions, and numerical values set forth in these embodiments are not intended to limit the scope of the present invention.

An exemplary embodiment of the present invention is described below. An illumination optical system according to the exemplary embodiment of the present invention guides a light flux from a light source unit onto an illuminated surface on which a liquid crystal panel, for example, is disposed.

The illumination optical system includes a compression system configured to compress the light flux (light flux diameter) emitted from a light source unit with different compression ratios for first and second cross sectional planes which are orthogonal to each other and which both include an optical axis of the illumination optical system. The compression system is disposed at a position closer to the light source unit than the position of a polarization conversion element, which will be described in detail later below.

Further, the illumination optical system includes a polarization conversion element and a condenser lens. The polarization conversion element unifies polarization states of light fluxes and causes the light fluxes to exit from the polarization conversion element. The condenser lens condenses the light flux from the polarization conversion element and guides the light flux to an illuminated surface on which a liquid crystal panel is disposed. Furthermore, the illumination optical system includes a polarized light splitting unit. The polarized light splitting unit includes a polarization splitting surface disposed within an optical path between the condenser lens and the illuminated surface, on which an image display element such as a reflection type liquid crystal panel is disposed.

In addition, a projection-type image display apparatus according to the exemplary embodiment of the present invention includes the illumination optical system, one or more image display elements, and a projection optical system that projects an image of the one or more illumination display elements onto a projection surface. Reference number 9 illustrated in FIG. 2 shows the projection optical system (projection lens) that projects an image light flux (a modulated light flux) from an image display element (an image modulation element) onto the projection surface.

First Exemplary Embodiment

Figure 1:
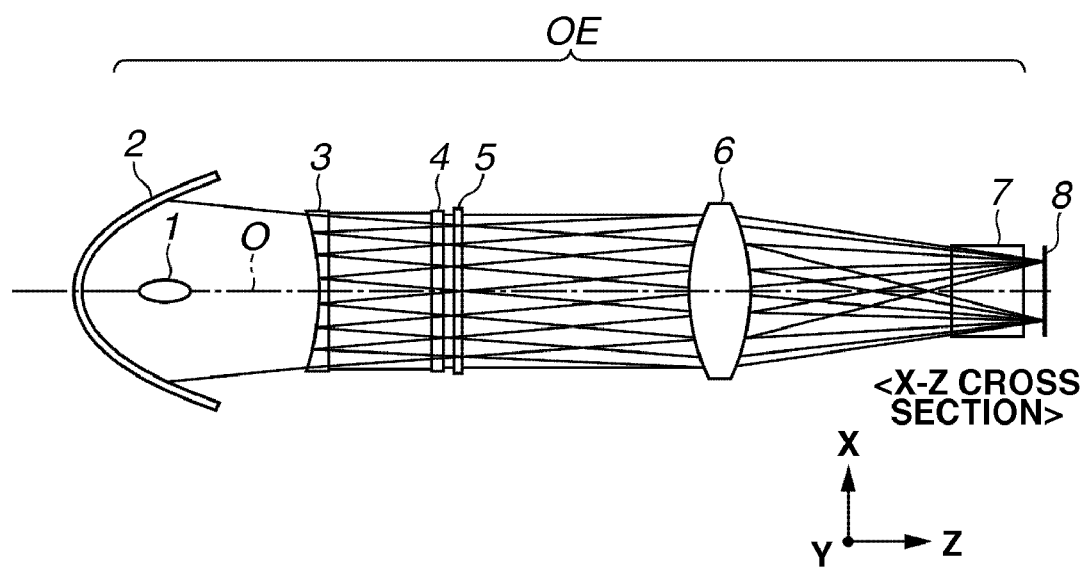
FIG. 1 is an X-Z cross section of an illumination optical system according to a first exemplary embodiment of the present invention.

A first exemplary embodiment of the present invention is described below. FIGS. 1 and 2 illustrate components of a projection-type display apparatus that uses an illumination optical system according to the present exemplary embodiment.

Figure 2:
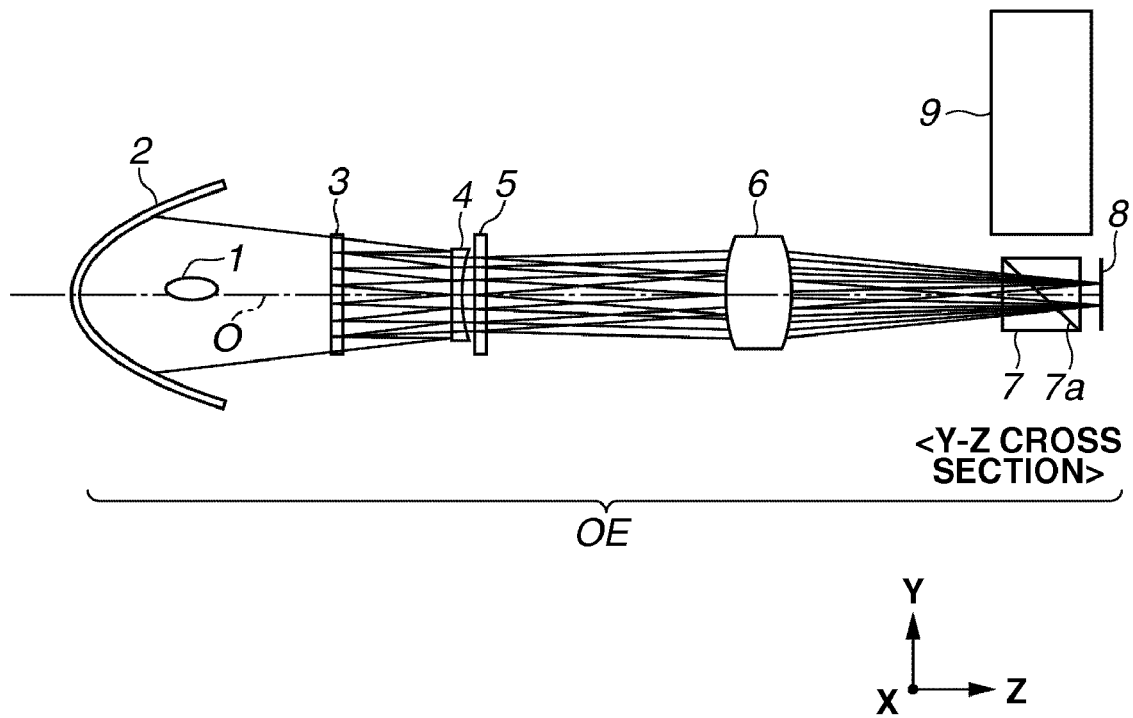
FIG. 2 is a Y-Z cross section of the illumination optical system according to the first exemplary embodiment of the present invention.

Referring to FIGS. 1 and 2, an illumination optical system OE includes a light source unit 1 such as a high pressure mercury discharge tube and an elliptical reflector (a light flux condensing unit) 2 having a concave reflection surface (preferably parabolic or elliptical).

In addition, the illumination optical system OE includes first and second fly-eye lenses (lens arrays) 3 and 4 that split (separate) a light flux into a plurality of light fluxes. Further, the illumination optical system OE includes a polarization conversion element 5 that causes incident polarized or non-polarized light flux to exit from the polarization conversion element 5 as a linear polarized light flux having a predetermined polarization. A condenser lens 6 superimposes the partial light fluxes that have exited from the polarization conversion element 5, on the illuminated surface.

In addition, the illumination optical system OE includes a polarizing beam splitter (a polarized light splitting unit) 7. The condenser lens 6 illuminates a liquid crystal panel (an image display element) 8 which is provided on the illuminated surface with the light that exits from the polarization conversion element 5 via the polarizing beam splitter 7. In addition, the illumination optical system OE includes a projection lens (projection optical system) 9 that projects the light reflected by the liquid crystal panel 8 onto the projection surface (screen).

The light flux emitted from the light source unit 1 is converted by the elliptical reflector 2 into a condensing light flux. The reflection light reflected on the elliptical reflector 2 is then split into a plurality of light fluxes by the first fly-eye lens 3.

The plurality of light fluxes split by the first fly-eye lens 3 then forms a plurality of secondary light source images on a light-incidence surface or a light-exiting surface of the polarization conversion element 5 or in the proximity thereof via the second fly-eye lens 4.

Figure 34:
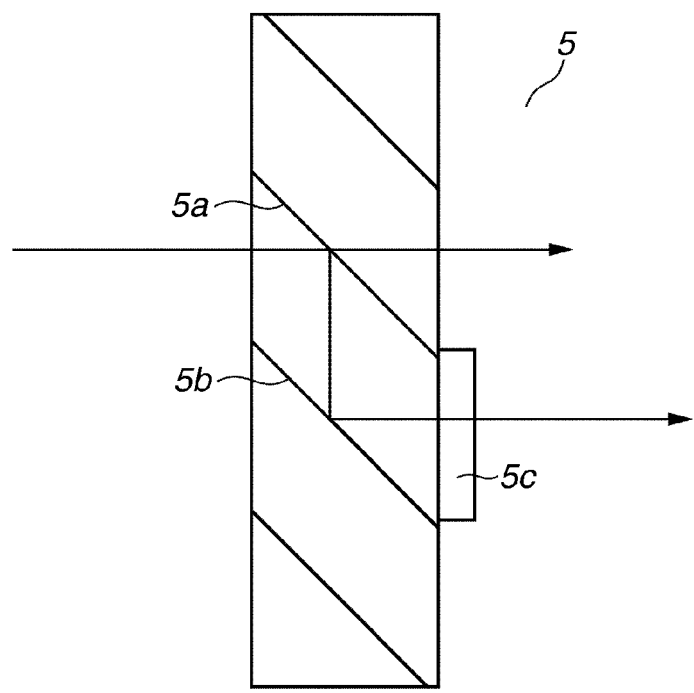
FIG. 34 is a cross section illustrating exemplary components of the polarization conversion element illustrated in FIG. 1 according to an exemplary embodiment of the present invention.

The polarization conversion element 5 includes a plurality of polarization splitting surfaces 5a (FIG. 34) and a plurality of reflectors 5b (FIG. 34) and a plurality of ½-wavelength plates 5c (FIG. 34). A polarization component of the light incident on the polarization splitting surface 5a that has a predetermined polarization direction, passes through the polarization split surface 5a to exit from the polarization conversion element 5.

On the other hand, a polarization component of the light incident on the polarization splitting surface 5a that has a polarization direction orthogonal to the predetermined polarization direction, is reflected from the polarization splitting surface 5a and onto the reflector 5b. Then, the polarization direction of the polarization component orthogonal to the predetermined polarization direction is changed by 90 degrees by the ½ wavelength plate 5c, and then the polarization component exits from the polarization conversion element 5.

Thus, the polarization conversion element 5 converts incident non-polarized light into linear polarized light having a predetermined polarization direction. The light converted by the polarization conversion element 5 is then emitted and incident on the condenser lens 6.

The plurality of split light fluxes that has exited from the polarization conversion element 5 passes through a polarization splitting surface 7a of the polarizing beam splitter 7 to be superimposed on the reflection type liquid crystal panel 8. Thus, the liquid crystal panel 8 is illuminated with the illumination light fluxes having a uniform light distribution.

The light that has been image-modulated and reflected by the liquid crystal panel 8 is then incident on the polarizing beam splitter 7 again. Then, the light is reflected by the polarization splitting surface 7a of the polarizing beam splitter 7 and is guided into the projection lens 9. The projection lens 9 projects image information formed on the first fly-eye lens 3 onto the projection surface (screen) in the y direction.

In the present exemplary embodiment, an optical axis O of the illumination optical system OE perpendicularly passes through the center of the panel surface of the liquid crystal panel 8. In the present exemplary embodiment, the optical axis O is taken as a Z-axis.

Figure 3:
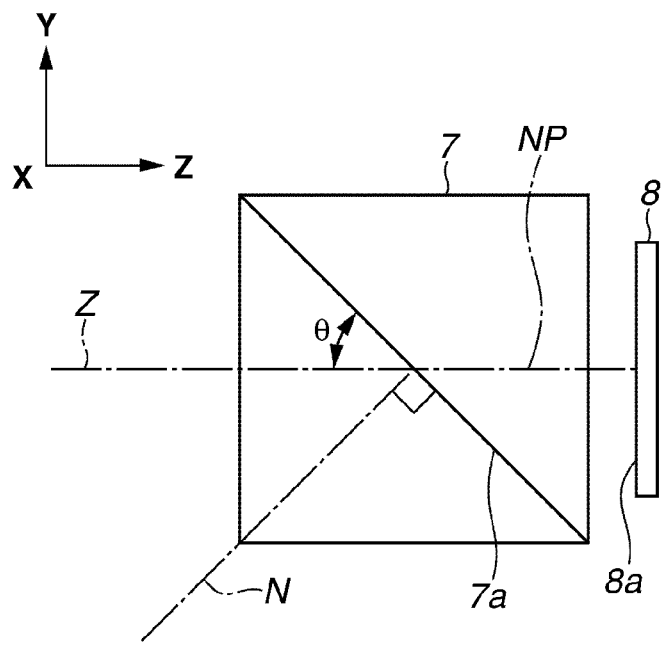
FIG. 3 is a Y-Z cross section illustrating an example of a polarizing beam splitter according to the first exemplary embodiment of the present invention.

In the present exemplary embodiment, as illustrated in FIG. 3, a plane (a plane equivalent to the plane of the paper of FIG. 3) including the optical axis (Z-axis) and a line N normal to the polarization split surface 7*a* of the polarizing beam splitter 7 which surface intersects with the optical axis (Z-axis), is taken as the Y-Z cross section plane (a second cross section plane). Further, a cross section plane orthogonal to a Y-Z cross section and including the optical axis is taken as an X-Z cross section (a first cross section plane). It is to be noted that the same Z-axis, X-Z cross section plane, and Y-Z cross section plane are also used in each of the following exemplary embodiments of the present invention.

FIG. 1 illustrates an optical arrangement of each member on X-Z side (the first cross section plane). The X-Z cross section is a cross section in a direction of a longer edge of the liquid crystal panel 8.

FIG. 2 illustrates an optical arrangement of each member on the Y-Z cross section (the second cross section plane) The Y-Z cross section is a cross section in a direction of a shorter edge of the liquid crystal panel 8.

As illustrated in FIG. 3, the polarizing beam splitter 7 includes the polarizing splitting film (polarization splitting surface) 7*a* consisting of a multilayer film inclined toward the optical axis (the Z-axis) O of the illumination optical system OE. The inclination θ of the polarization split surface 7*a* toward the optical axis O of the illumination optical system OE is set at 45 degrees in the present exemplary embodiment. However, 40 to 50 degrees can be set for the angle θ.

The polarizing splitting film 7*a* has a splitting function of reflecting 80% or more than 80% of the light traveling in a first polarization direction of the light incident at a predetermined angle and transmitting 80% or more than 80% of the light traveling in a second polarization direction orthogonal to the first polarization direction.

Figure 4:
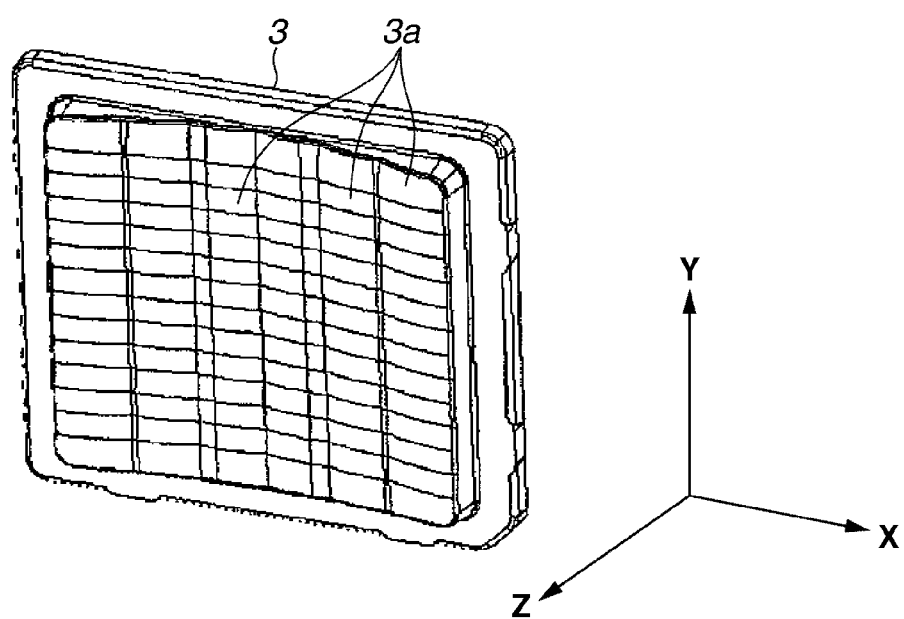
FIG. 4 illustrates an example of a first fly-eye lens according to the first exemplary embodiment of the present invention.

FIG. 4 is a perspective view illustrating a portion of the first fly-eye lens 3 according to the present exemplary embodiment. FIG. 5 is the X-Z cross section of a portion of the first fly-eye lens 3 near the optical axis according to the present exemplary embodiment. FIG. 6 is a perspective view illustrating an e portion of the second fly-eye lens 4 according to the present exemplary embodiment.

The first fly-eye lens (first optical element) 3 and the second fly-eye lens (second optical element) 4 constitute the compression system. The compression system is disposed between the light source unit 1 (or the elliptical reflector 2) and the polarization conversion element 5. More specifically, the compression system is disposed at a position closer to the illuminated surface (image display element such as a liquid crystal panel) than the position of the light source unit 1, and closer to the light source unit (light source side) than the position of the polarization conversion element 5.

The first fly-eye lens 3 has a negative refractive power in either the first or the second cross section planes. The second fly-eye lens 4 has a negative refractive power different from the negative refractive power of the first fly-eye lens 3 in the other cross section plane.

The first fly-eye lens 3 is constituted by a plurality of lens cells 3*a*, which is arranged in a two-dimensional array. The second fly-eye lens 4 is constituted by a plurality of lens cells 4*a*, which is also arranged in a two-dimensional array. The optical axis O of the lens cells 3*a* and 4*a* of the first fly-eye lens 3 and the second fly-eye lens 4 is in parallel to the Z-axis.

With respect to the first fly-eye lens 3, as can be seen from FIGS. 4 and 5, each of optical axes O1 and O2 etc. of lens cells (3*a*1, 3*a*2, etc.) other than a lens cell 3*a*0 that is disposed at the center (on the optical axis) of the plurality of lens cells 3*a* is decentered to an outer side of a direction of X from an optical axis O1' and an optical axis O2', respectively. The optical axes 01 and 02 are not decentered in the Y direction. Owing to this configuration, the first fly-eye lens 3, as a whole, has a lens function as a negative (concave) lens (diverging function) in the X-Z cross section plane with respect to the light flux from the elliptical reflector 2. Here, the central axes O1' and O2' refer to axes passing through a center of an outer diameter of the lens cell and parallel to the optical axis O.

Now, the optical effect (lens function) of the first fly-eye lens 3 will be described in detail below with reference to FIG. 5. FIG. 5 illustrates the lens cell 3*a*0, which is disposed at the center portion of the first fly-eye lens 3 on the optical axis O in the X-Z cross section, and the lens cells (outer lens cells) 3*a*1 and 3*a*2, which are adjacent to the lens cell 3*a*0 in the X direction. Referring to FIG. 5, converged rays r1 and r2 respectively passing through the centers (outer dimension centers) P1 and P2 of the lens cells 3*a*1 and 3*a*2 become parallel to the optical axis O after passing through the lens cells 3*a*1 and 3*a*2.

The above-described optical effect (lens function) can be achieved with the following configuration. In the example illustrated in FIG. 5, each of surface vertexes Q1 and Q2 of the lens cells 3*a*1 and 3*a*2 is taken as a position of intersection between the optical axes O1 and O2 and the lens cell. Further, in the example illustrated in FIG. 5, each of the centers P1 and P2 of outer lens cells 3*a*1 and 3*a*2 is taken as a position of intersection between the center axes O1' and O2' and the surface of the lens cell. The surface vertex Q1 (Q2) is decentered to an outer side of (so as to deviate from) the optical axis O away from the center P1 (P2).

The second fly-eye lens 4 illustrated in FIG. 6 corresponds to a state when the first fly-eye lens 3 (FIG. 4) is rotated by 90 degrees around the optical axis O.

Figure 31:
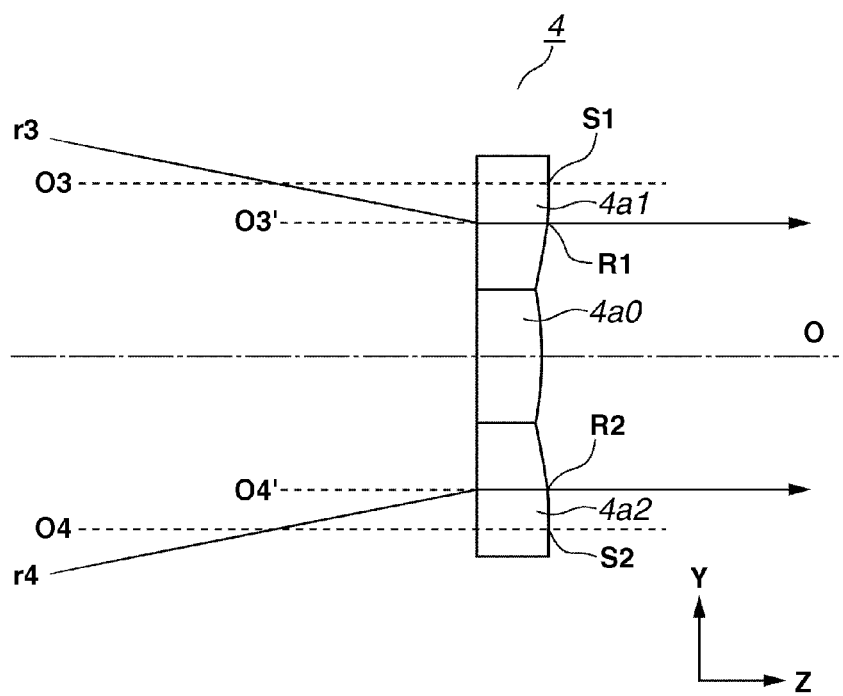
FIG. 31 illustrates an example of an optical effect of the second fly-eye lens illustrated in FIG. 1 according to an exemplary embodiment of the present invention.

With respect to the second fly-eye lens 4, each of optical axes O3 and O4 of lens cells 4*a*1 and 4*a*2 other than a center lens cell 4*a*0 of the lens cells 4*a* is decentered to an outside away from central axes O3' and O4' in the Y direction. The optical axes O3 and O4 are not decentered in the direction of X, as illustrated in FIGS. 6 and 31. With this configuration, the second fly-eye lens 4, as a whole, has a lens function as a negative (concave) lens (diverging function) in the Y-Z cross section plane with respect to the light flux from the elliptical reflector 2.

Now, the optical effect (lens function) of the second fly-eye lens 4 will be described in detail below with reference to FIG. 31. FIG. 31 illustrates the lens cell 4*a*0, which is disposed at the center portion of the second fly-eye lens 4 on the optical axis O in the Y-Z cross section plane, and the lens cells (outer lens cells) 4*a*1 and 4*a*2, which are adjacent to the lens cell 4*a*0 in the Y direction. Referring to FIG. 31, each of converged rays r3 and r4 respectively passing through the centers (outer dimension centers) R1 and R2 of the lens cells 4*a*1 and 4*a*2 becomes parallel to the optical axis O after passing through the lens cells 4*a*1 and 4*a*2.

The above-described optical effect (lens function) can be achieved in the following configuration. In the example illustrated in FIG. 31, each of surface vertexes S1 and S2 of the lens cells 4*a*1 and 4*a*2 is taken as a position of intersection between the optical axes O3 and O4 and the lens cell. Further, each of the centers R1 and R2 of outer lens cells 4*a*1 and 4*a*2 is taken as a position of intersection between the center axes O3' and O4' and the surface of the lens cell.

The surface vertex S1 (S2) is decentered to an outer side of the center R1 (R2) from the optical axis O. It is to be noted that in the exemplary configuration of the second fly-eye lens 4 illustrated in FIG. 31, the orientation of the lens cell (the orientation of the light-incidence side and the light-exiting side) are reversed from that illustrated in FIG. 5. An effect of decentralization is the same on the light-incidence side and the light-exiting side.

In the present exemplary embodiment, the angular distribution of the light flux is smaller in the direction in which the polarizing beam splitter 7 is sensitive to the angular distribution of light flux (namely, in the direction of the Y-Z cross section). With this configuration, the uneven brightness of an image or the degradation of contrast of the image can be suppressed when the image displayed on the liquid crystal panel 8 is projected onto the projection surface via the polarizing beam splitter 7. Accordingly, the present exemplary embodiment can project an image with a high brightness and high contrast.

In the present exemplary embodiment, the angular distribution of the light flux incident on the panel surface of the liquid crystal panel 8 is larger in the X-Z cross section plane (the first cross section illustrated in FIG. 1) which is parallel to the longer edge of the liquid crystal panel 8, than in the Y-Z cross section plane (the second cross section illustrated in FIG. 2) which is parallel to the shorter edge of the liquid crystal panel 8.

In the present exemplary embodiment, the first and the second fly-eye lenses 3 and 4 are provided between the light source unit 1 and the polarizing beam splitter 7 as the compression system. The first fly-eye lens 3 and the second fly-eye lens 4, as the compression system, respectively compress the light flux in the first cross section plane (the X-Z cross section) and the second cross section plane (the Y-Z cross section) of the illumination optical system OE which are orthogonal to each other.

With respect to a compression ratio (parallelization magnification ratio) of the light flux, a compression ratio α in the first cross section plane (the X-Z cross section) is different from a compression ratio β in the second cross section plane (the Y-Z cross section). In the present exemplary embodiment, a relationship of the compression ratios α and β is α<β.

Now, a light flux compression function of the first fly-eye lens 3 and the second fly-eye lens 4 according to the present exemplary embodiment will be described.

Figure 7:
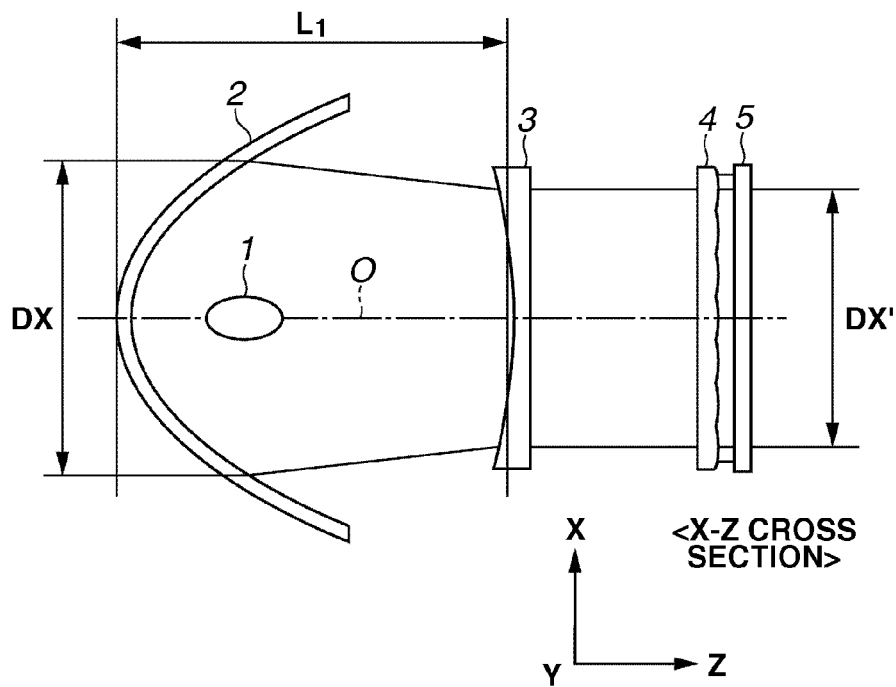
FIG. 7 is an enlarged view illustrating an optical path in the X-Z cross section from a reflector to a polarization conversion element according to the first exemplary embodiment of the present invention.
Figure 8:
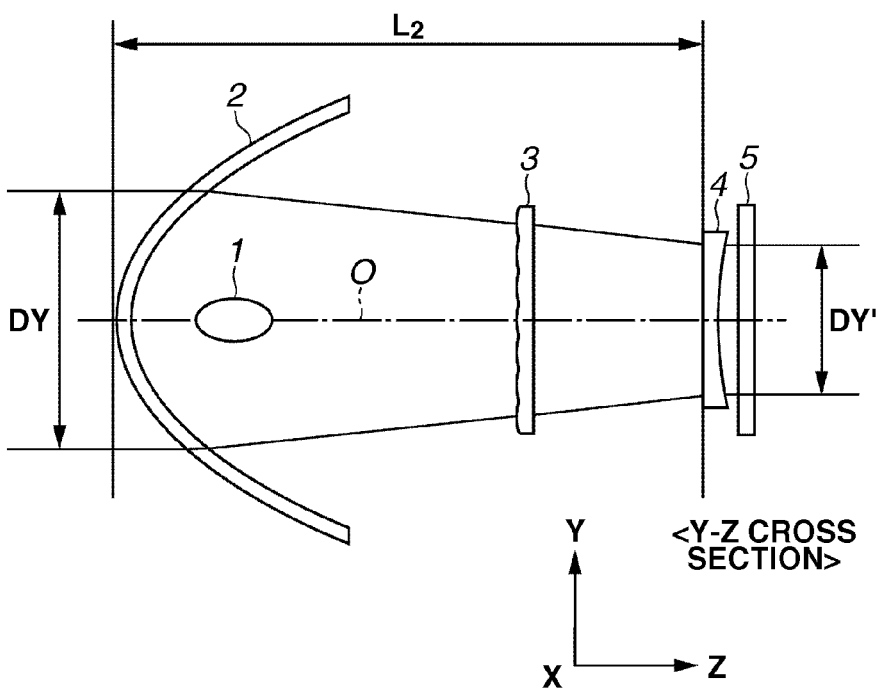
FIG. 8 is an enlarged view illustrating an optical path in the Y-Z cross section from the reflector to the polarization conversion element according to the first exemplary embodiment of the present invention.

FIGS. 7 and 8 are enlarged views illustrating the optical path with respect to the components (the elliptical reflector 2, the first fly-eye lens 3, the second fly-eye lens 4, and the polarization conversion element 5 (FIGS. 1 and 2)) of the present exemplary embodiment.

Referring to FIG. 7, the converged ray having been reflected on the elliptical reflector 2 and passing through the center of the lens cell of the first fly-eye lens 3 exits from the X-Z cross section after having been converted by the first fly-eye lens 3 into a ray parallel to the optical axis O. On the other hand, referring to FIG. 8, the converged ray passing through the center of the lens cell of the second fly-eye lens 4 exits from the Y-Z cross section after having been converted by the second fly-eye lens 4 into a ray parallel to the optical axis O.

That is, in the example illustrated in FIG. 7, the light flux is compressed by the elliptical reflector 2 and the first fly-eye lens 3 in the X-Z cross section plane. On the other hand, in the example illustrated in FIG. 8, the light flux is compressed by the elliptical reflector 2 and the second fly-eye lens 4 in the Y-Z cross section plane.

The term "compression of the light flux" refers to a process of reducing the width of the light flux (light flux diameter) by the elliptical reflector 2, then parallelizing the light passing through the center of the lens cell of the first fly-eye lens 3 and the second fly-eye lens 4 through exiting the parallel ray of light. Furthermore, the first fly-eye lens 3 and the second fly-eye lens 4, which compress the light flux, is referred to as a compression optical system (the compression system). The process of light flux compression can be achieved not only by the present exemplary embodiment but also by another aspect of the present invention, which will be described in detail below.

The light flux compression ratio refers to a ratio of a width "D" of the light flux (in a direction perpendicular to the optical axis O) reflected by the elliptical reflector 2 to a width "D'" of the light flux after passing through the first fly-eye lens 3 or the second fly-eye lens 4, namely, a ratio "D/D'". That is, the compression ratio can be obtained as a result of dividing the diameter (width) of the light flux before being compressed by the compression system by the diameter (width) of the light flux after being compressed by the compression system. For example, when the light flux width D immediately after being reflected on the elliptical reflector 2 is reduced to half (D/2) immediately after passing through the first fly-eye lens 3 (or the second fly-eye lens 4), the compression ratio is "2".

The compression ratio α in the X-Z cross section and the compression ratio β in the Y-Z cross section can be calculated by the following expression:

$$\alpha = DX/DX'$$

$$\beta = DY/DY'$$

where "DX" denotes the width of the light flux in the X-Z cross section (FIG. 7) at the time the light flux exits from (is reflected by) the elliptical reflector 2, "DY" denotes the width of the light flux in the Y-Z cross section (FIG. 8) at the time the light flux exits from (is reflected by) the elliptical reflector 2, "DX'" denotes the width of the light flux in the X-Z cross section (FIG. 7) at the time the light flux is incident on the polarization conversion element 5, and "DY'" denotes the width of the light flux in the Y-Z cross section (FIG. 8) at the time the light flux is incident on the polarization conversion element 5.

In the present exemplary embodiment, the light flux that has exited from the first fly-eye lens 3 (the second fly-eye lens 4) is incident on the polarization conversion element 5 as a parallel light flux. Therefore, the compression ratio α and the compression ratio β can be determined according to a distance between the elliptical reflector 2 and the first fly-eye lens 3 or the second fly-eye lens 4 (hereinafter simply referred to as a "compression distance").

In the example illustrated in FIG. 7, the compression distance is equivalent to a distance $L_1$ in the X-Z cross section plane because the light flux is compressed by the elliptical reflector 2 and the first fly-eye lens 3. On the other hand, in the example illustrated in FIG. 8, the compression distance is equivalent to a distance $L_2$ in the Y-Z cross section plane because the light flux is compressed by the elliptical reflector 2 and the second fly-eye lens 4. Accordingly, the present exemplary embodiment uses different light flux compression ratios for the X-Z cross section and the Y-Z cross section.

More specifically, the compression ratio α can be calculated by the following expression:

$$\alpha = DX/DX' = |f_2|/|f_{f1}|$$

where "$f_2$" denotes a focal length of the elliptical reflector 2 and "$f_{f1}$" denotes a focal length of the first fly-eye lens 3 in the X-Z cross section obtained by the converging lens effect.

Similarly, the compression ratio β can be calculated by the following expression:

$$\beta = DY/DY' = |f_2|/|f_{2}'|$$

where "$f_{f2}$" denotes a focal length of the second fly-eye lens 4 in the Y-Z cross section obtained by the converging lens effect. Furthermore, the distances $L_1$ and $L_2$ can be expressed as follows:

$$L_1 = |f_2|f_{f1}|$$

$$L_2 = |f_2|f_{f2}|.$$

Since $L_1/L_2 < 1$, the light flux compression ratio β in the Y-Z cross section is greater than the light flux compression ratio α in the X-Z cross section. That is, $$\alpha/\beta < 1.$$

As described above, the converged light flux exits from the elliptical reflector 2 in the present exemplary embodiment. Thus, the present exemplary embodiment achieves a light flux compression ratio that is larger in the Y-Z cross section than in the X-Z cross section utilizing the difference in the distance between the elliptical reflector 2, and the first fly-eye lens 3 and the second fly-eye lens 4. Accordingly, in the present exemplary embodiment, loss of brightness is smaller than an apparatus that utilizes an aperture effect achieved by the shape of a second fly-eye lens to obtain the difference of light flux angular distributions in the X-Z cross section plane and the Y-Z cross section plane.

In the present exemplary embodiment, the light flux angular distribution is smaller in the direction in which the polarizing beam splitter 7 is sensitive to the light flux angular distribution (in the direction of the Y-Z cross section) Thus, the present exemplary embodiment can reduce the uneven brightness of an image or the degradation of contrast of the image in projecting the image displayed on the liquid crystal panel 8 onto the projection surface via the polarizing beam splitter 7. Accordingly, the present exemplary embodiment can project an image onto the projection surface (screen surface) with a high brightness and high contrast.

An F number Fno (hereinafter simply referred to as an "Fno") for the illumination optical system can be calculated based on a maximum angle of incidence of the light flux that is incident on the illuminated surface. That is, the Fno is defined as a quotient of a division "$f_c/D$" calculated by dividing the width of the light flux D incident on the polarization conversion element 5 by a focal length $f_c$ of the condenser lens 6.

Since DX'>DY' with respect to the light flux width, the Fno in the X-Z cross section plane differs from that in the Y-Z cross section plane. Hereinafter, the Fno is a value in the X-Z cross section, which is smaller than the Fno in the Y-Z cross section defined as described above.

In the present exemplary embodiment, a projection image brightness L of the projection image is related to the Fno and a ratio α/β between the compression ratio α and the compression ratio β. Hereinafter, the compression ratio α/β is simply referred to as "α/β".

The degree of brightness L which is related to both the Fno and α/β can be calculated by the following expression:

$$L = \{-1.94*(\alpha/\beta)^4 + 3.86*(\alpha/\beta)^2\}*(1/Fno).$$

As the Fno becomes greater or α/β becomes smaller, the brightness L decreases and the brightness of the projection image is lowered.

Figure 9:
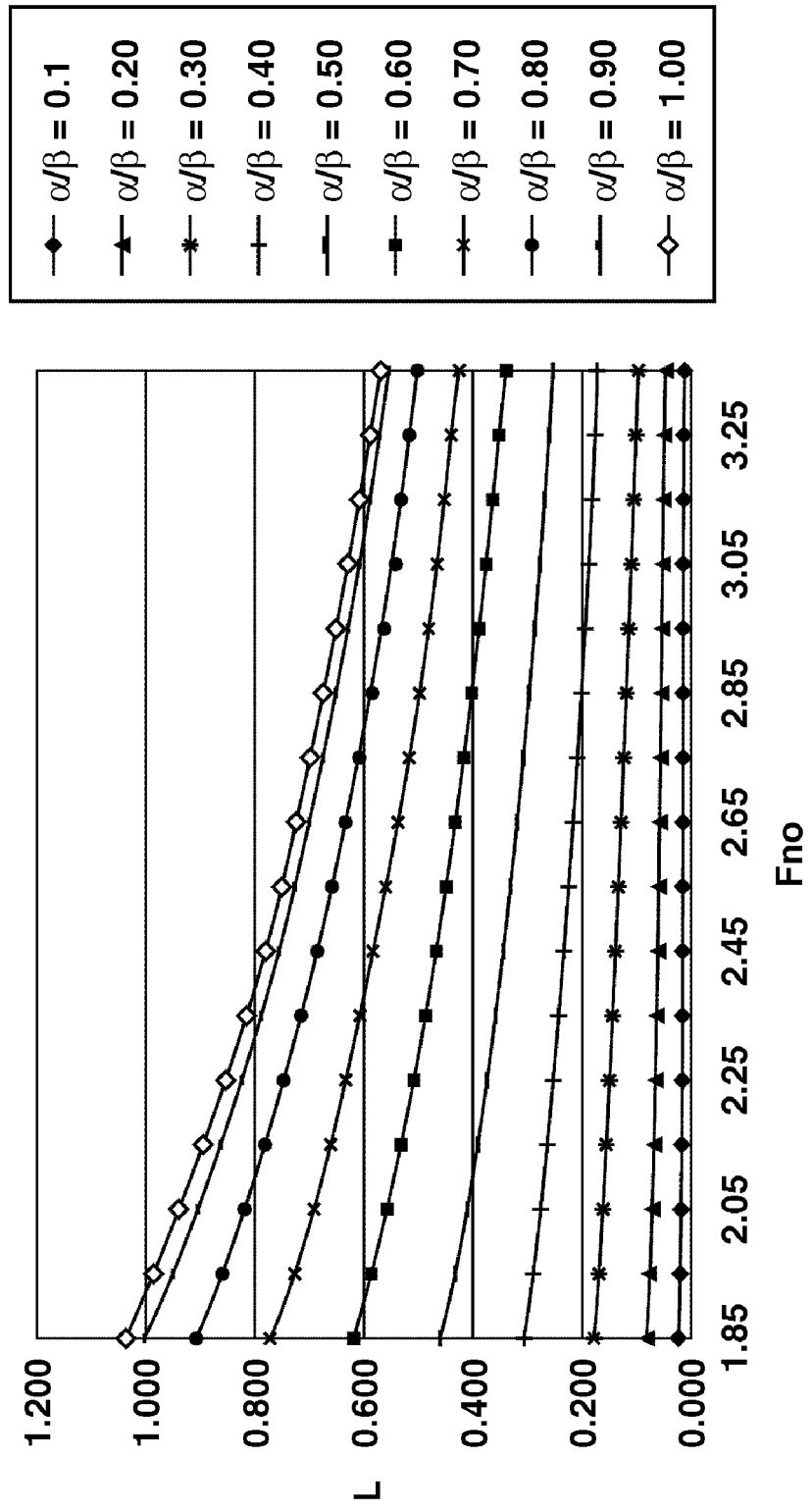
FIG. 9 illustrates a variation in the brightness of the illumination of the illumination optical system, which is indicated by an F number (Fno) and an asymmetrical compression ratio, according to the first exemplary embodiment of the present invention.

FIG. 9 illustrates the brightness L in the case where the Fno and α/β are used as parameters according to the present exemplary embodiment.

The contrast of the projection image can be calculated based on a leaking light ratio for each angle of incidence of the rays. The "leaking light ratio" refers to a ratio of the light reaching the projection surface (screen) even when a black image is displayed.

Figure 10:
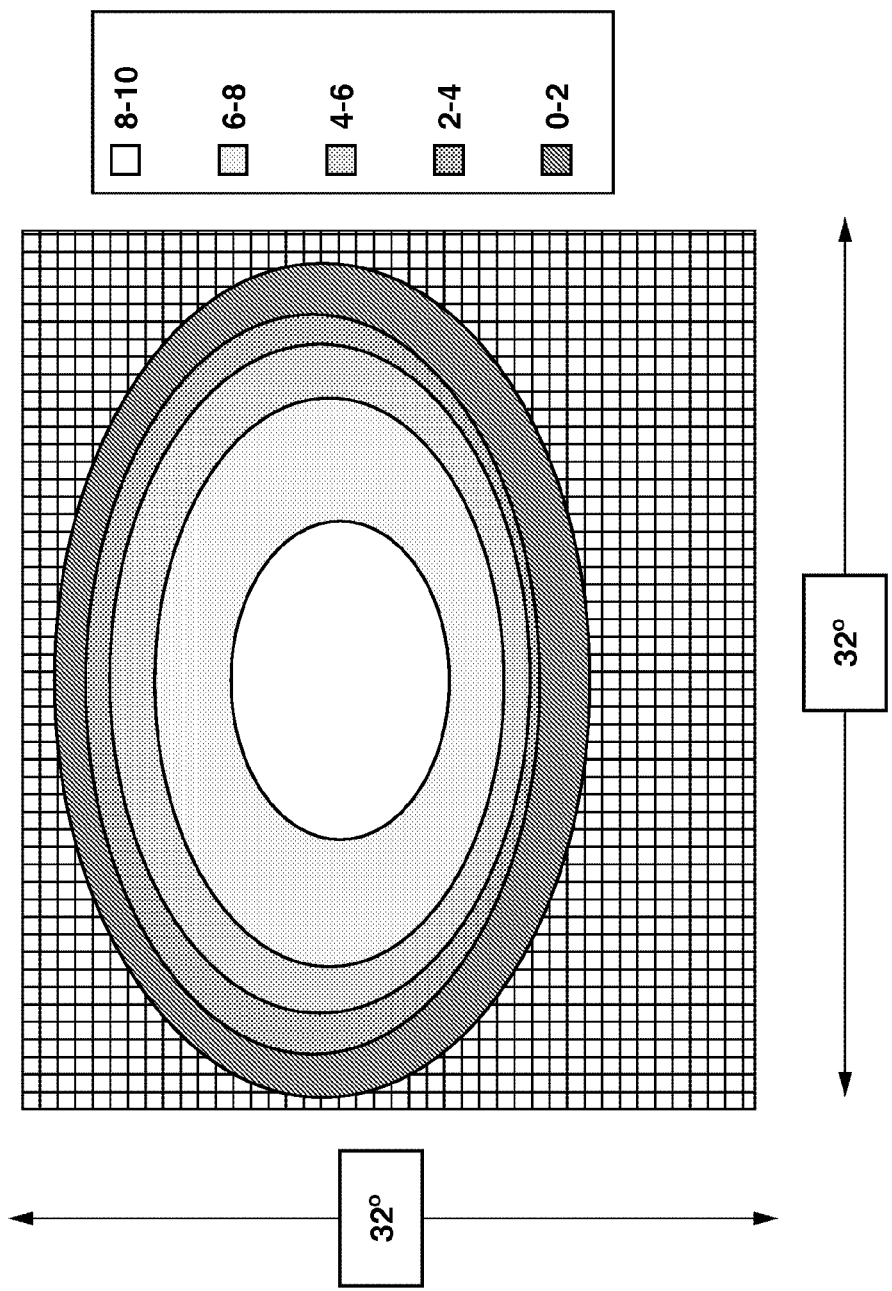
FIG. 10 illustrates a leaking light ratio for each angle of incidence in the illumination optical system according to the first exemplary embodiment of the present invention.

FIG. 10 illustrates an exemplary leaking light ratio for each angle of incidence of the rays according to the present exemplary embodiment. Referring to FIG. 10, a center portion of the figure corresponds to a direction of a line normal to the liquid crystal panel 8. The angle of incidence is larger in a peripheral portion, which indicates that the leaking light ratio becomes greater as the angle of incidence becomes larger. A value for a leaking light map is determined according to the angle of incidence. Therefore, the calculated contrast is related to both the Fno and α/β, which determine the angle of incidence of the light flux emitted from the illumination optical system with respect to the liquid crystal panel, which are determined at the time of designing the illumination optical system.

The degree of a contrast C, which can be calculated related to both the Fno and α/β, can be calculated by the following expression:

$$C = 1 - \{(1.567*(\alpha/\beta)^2 + 0.89)*(1/Fno)^{7/4}\}.$$

As the Fno becomes greater or α/β becomes smaller, the resulting contrast C increases, which indicates that the contrast C becomes higher.

Figure 11:
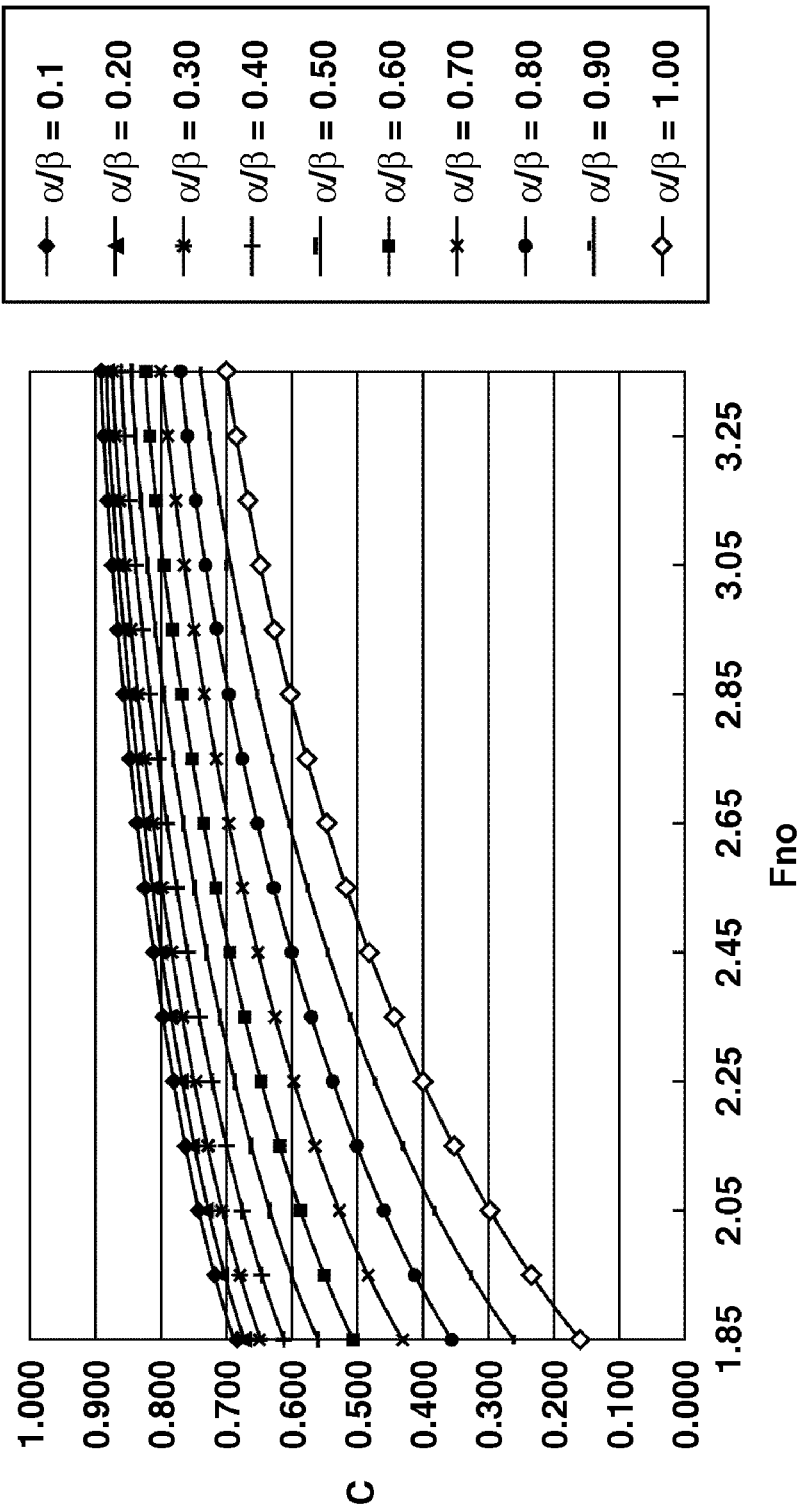
FIG. 11 illustrates a variation in contrast of the illumination of the illumination optical system with an Fno and an asymmetrical compression ratio according to the first exemplary embodiment of the present invention.

FIG. 11 illustrates the contrast C in the case where the Fno and α/β are used as parameters according to the present exemplary embodiment. In the case of increasing both the brightness L and the contrast C, both the brightness L and the contrast C are shifted to a positive direction in a coordinate system in which the brightness L is taken on the horizontal axis and the contrast C is taken on the vertical axis.

Figure 12:
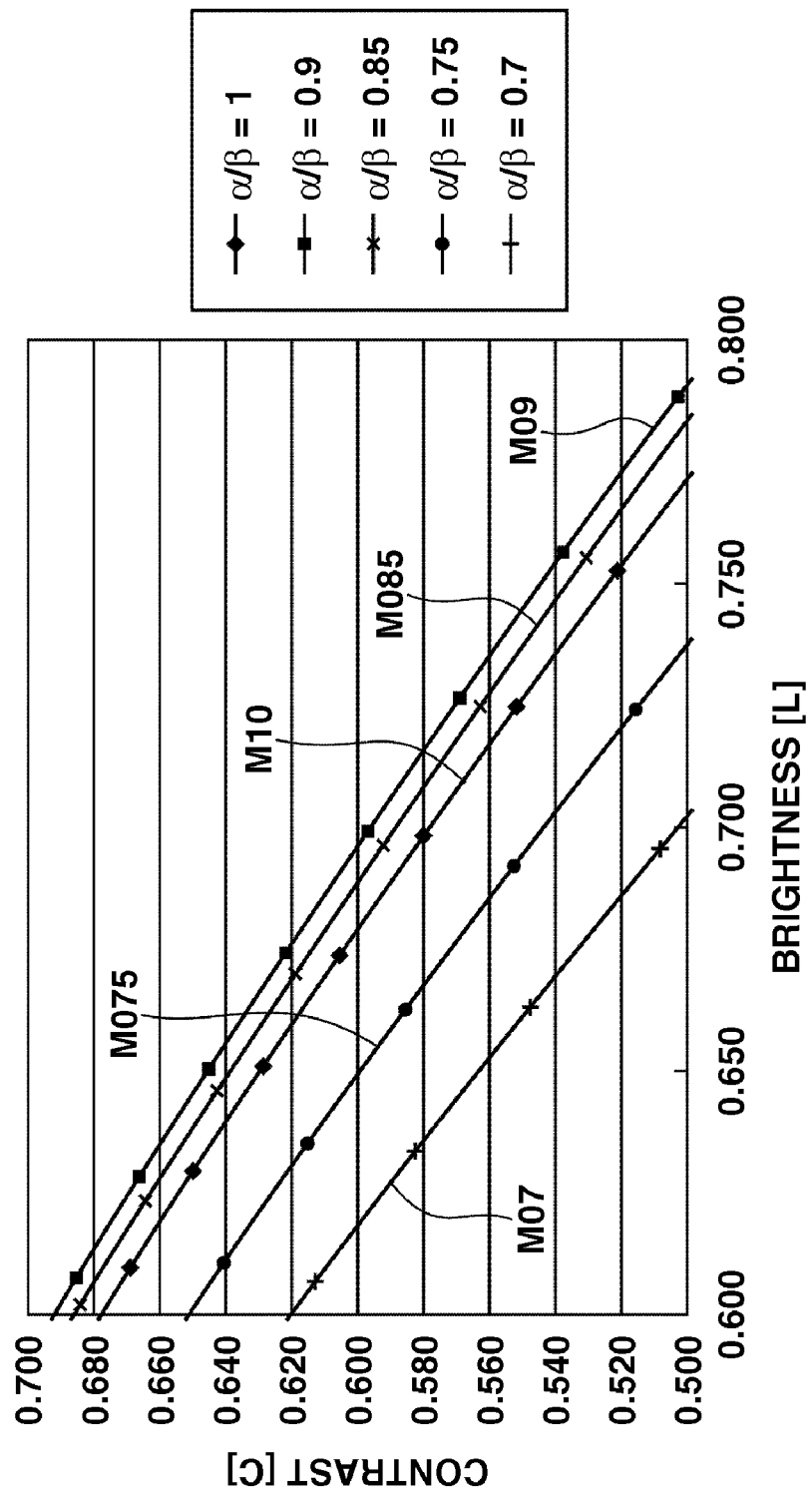
FIG. 12 illustrates brightness of the illumination optical system and a variation in the contrast according to the first exemplary embodiment of the present invention.

FIG. 12 illustrates a graph in which the brightness L is taken on the horizontal axis and the contrast C is taken on the vertical axis according to the present exemplary embodiment. Referring to FIG. 12, the brightness L becomes higher toward the right, and the contrast C becomes higher upward. That is, both the brightness L and the contrast C become higher toward the upper-right.

Referring to FIG. 12, a curve M10 indicates the brightness and the contrast when α/β=1. A curve M09 indicates the brightness and the contrast when α/β=0.9. A curve M085 indicates the brightness and the contrast when α/β=0.85. A curve M075 indicates the brightness and the contrast when α/β=0.75. A curve M07 indicates the brightness and the contrast when α/β=0.7.

In FIG. 12, the curve M09 lies at the upper-right most of the above-described curves. In the case of the asymmetrical light flux compression corresponding to the curve M09, both the brightness L and the contrast C are increased compared to the curve M10, which corresponds to a symmetrical compression. Further, with respect to the compression corresponding to the curve M085, which lies in the upper-right of the curve M10, both the brightness L and the contrast C are increased from the compression corresponding to the curve M10, according to the effect of asymmetrically compressing of the light flux.

On the other hand, in the case of the compression corresponding to the curve M075, which lies in the lower-left of the curve M10, both the brightness L and the contrast C are decreased from the compression corresponding to the curve M10. That is, by using α/β smaller than 1, namely, by utilizing the effect of asymmetrically compressing of the light flux, both the brightness L and the contrast C increase. However, both the brightness L and the contrast C begin to decrease at a specific value (peak value) of α/β. There is a minimum value of α/β at which the effect resulting from asymmetrically compressing of the light flux appears.

The present exemplary embodiment uses a product W of L*C (namely, a product of the brightness L and the contrast C) as an evaluation function. The product W can be expressed as a function "W(Fno, α/β)" using the Fno and α/β as parameters. If the product of the brightness L and the contrast C becomes larger, the product W on the corresponding curve moves to a upper-right location in the graph. That is, if the value for the function "W(Fno, α/β)" becomes greater, both the brightness L and the contrast C become higher.

Figure 13:
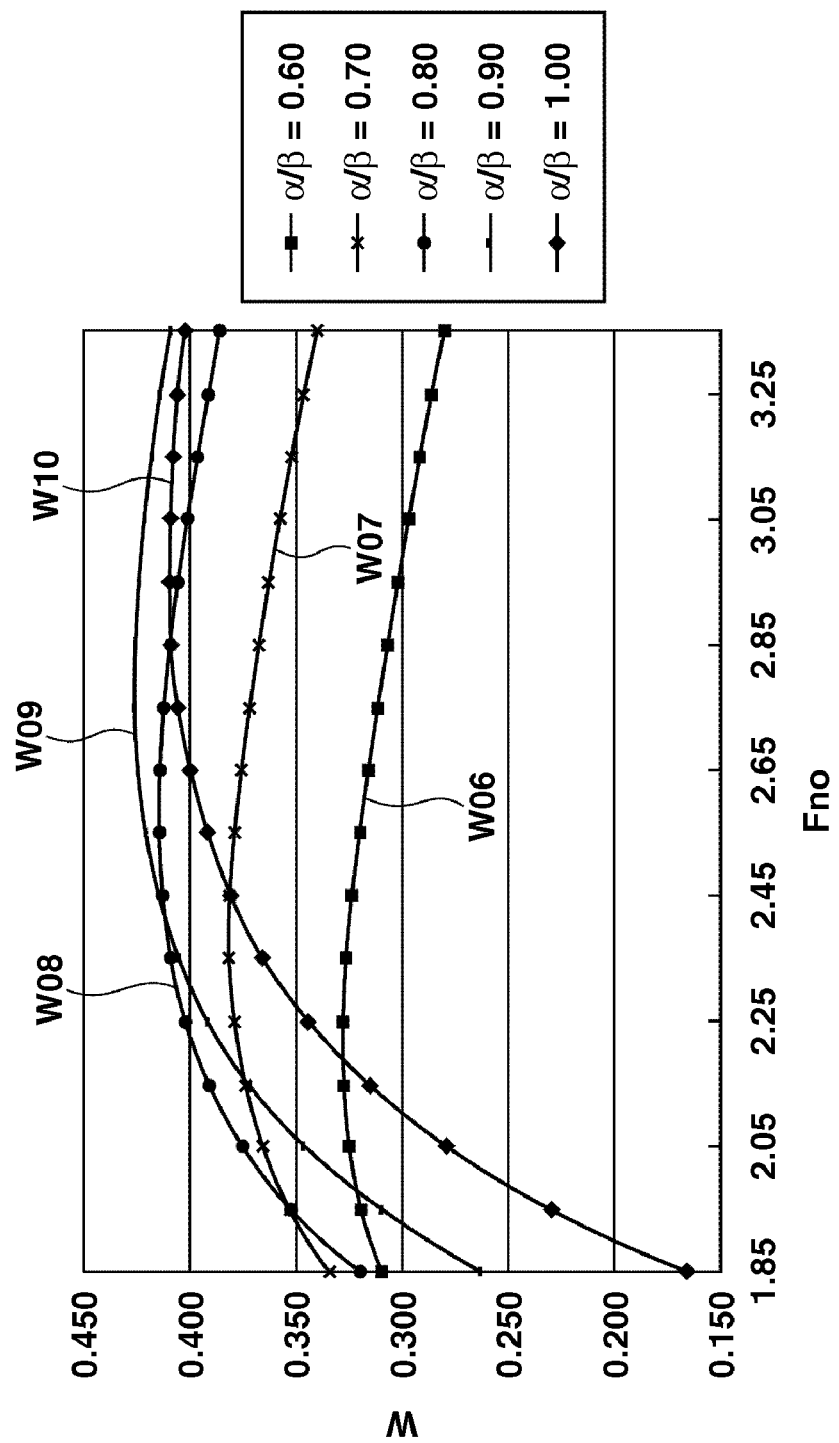
FIG. 13 illustrates a variation in a product of the brightness and the contrast of the illumination optical system, plotted using an Fno and an asymmetrical compression ratio according to the first exemplary embodiment of the present invention.

FIG. 13 illustrates a graph in which the Fno value is taken on its horizontal axis and the value for the function W(Fno, α/β) is taken on its vertical axis according to the present exemplary embodiment. Referring to FIG. 13, a curve W10 illustrates a product of the brightness and the contrast when α/β=1. A curve W09 illustrates a product of the brightness and the contrast when α/β=0.9. A curve W08 illustrates a product of the brightness and the product when the brightness with α/β=0.8. A curve W07 illustrates a product of the brightness and the contrast when α/β=0.7. A curve W06 illustrates a product of the brightness and the contrast when α/β=0.6. If the value for the product W when the Fno=2.25 is taken up, the value for the product W with respect to each of the curves W07 through W09 is greater than the value for the product W of the curve W10. The value for the product W with respect to the curve W06 is smaller than the value for the product W of the curve W10. If each of the curves W07 through W09 is more closely examined, the value for the product W of the curve W08 is found to be its maximum value for this Fno.

The value for the function "W(Fno=2.25, α/β)" can be increased by using α/β smaller than 1. However, with α/β=0.8 as a peak value, the value for the function "W" is decreased as α/β becomes small. Around α/β=0.6, the value for the function W(Fno=2.25, α/β) becomes smaller than W(Fno=2.25, α/β=1) and the effect of asymmetrically compressing of the light flux cannot be achieved. That is, there is a minimum value of α/β at which the effect resulting from asymmetrically compressing of the light flux appears.

In the present exemplary embodiment, the Fno=2.25. However, the value for the Fno is not limited to 2.25. Further, if Fno=2.25, a minimum value for α/β to achieve the effect of asymmetrically compressing of the light flux is about 0.63.

That is, in the case of setting an arbitrary value for the Fno, it is necessary that the value for α/β is equal to or greater than a specific minimum value $\gamma_1$ to satisfy a condition W(Fno, α/β)>W(Fno, α/β=1) and achieve the effect of asymmetrically compressing of the light flux. If the minimum value $\gamma_1$ is exceeded, the effect of asymmetrically compressing of the light flux cannot be achieved. Accordingly, it is useful, in asymmetrically compressing a light flux, to use α/β in the range of $\gamma_1<\alpha/\beta<1$ based on the Fno value.

Figure 14:
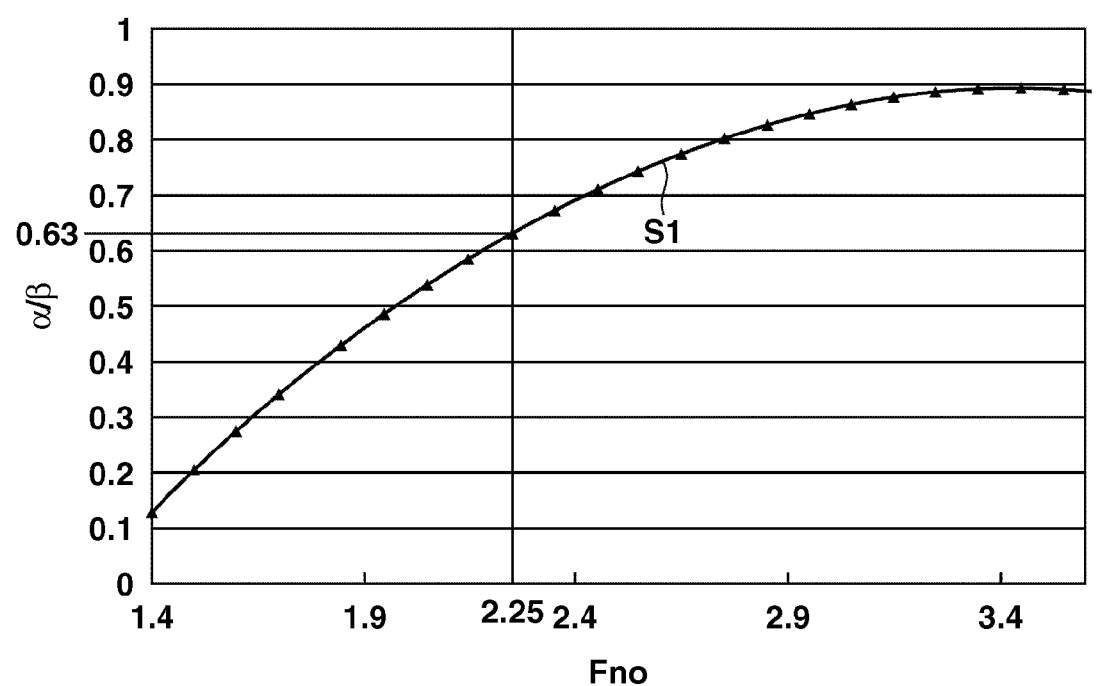
FIG. 14 illustrates an example of an asymmetrical compression ratio at which a light flux asymmetrical compression becomes effective in order to achieve balanced brightness and contrast and an optimum compression ratio for each Fno in the illumination optical system according to the first exemplary embodiment of the present invention.

FIG. 14 illustrates an exemplary curve S1 which indicates a minimum value $\gamma_1$ for each Fno value according to the present exemplary embodiment.

According to the curve illustrated in FIG. 14, the asymmetrical compression ratio α/β having a minimum value $\gamma_1$ can be expressed as a function of Fno by "α/β=−0.18*(Fno)$^2$+1.245*(Fno)−1.260". Here, if Fno=2.25, then α/β=0.63.

Therefore, in asymmetrically compressing the light flux, it is useful to set the compression ratio α/β for the compression optical system in the range where the following expression can be satisfied:

$$-0.18*(Fno)^2+1.245*(Fno)-1.260<\alpha/\beta<1 \quad (1)$$

where $$1.4 \leq Fno \leq 3.6 \quad (2)$$

$$1<\alpha<\beta \quad (3).$$

Further, at an α/β maximum value $\gamma_2$, a maximum value for the function W(Fno, α/β) can be obtained. The α/β maximum value $\gamma_2$ lies in the range $\gamma_1<\gamma_2<1$. The value for the function W(Fno, α/β) increases as α/β comes closer to the maximum value $\gamma_2$.

For example, if Fno=2.25, then the value for $\gamma_2$(α/β) is around 0.80, as illustrated in FIG. 13. Accordingly, it is more useful if the compression ratio α/β is in the range $\gamma_3 \leq \alpha/\beta \leq \gamma_4$, where $\gamma_3$ and $\gamma_4$ can satisfy $\gamma_1<\gamma_3<\gamma_2<\gamma_4<1$.

Figure 15:
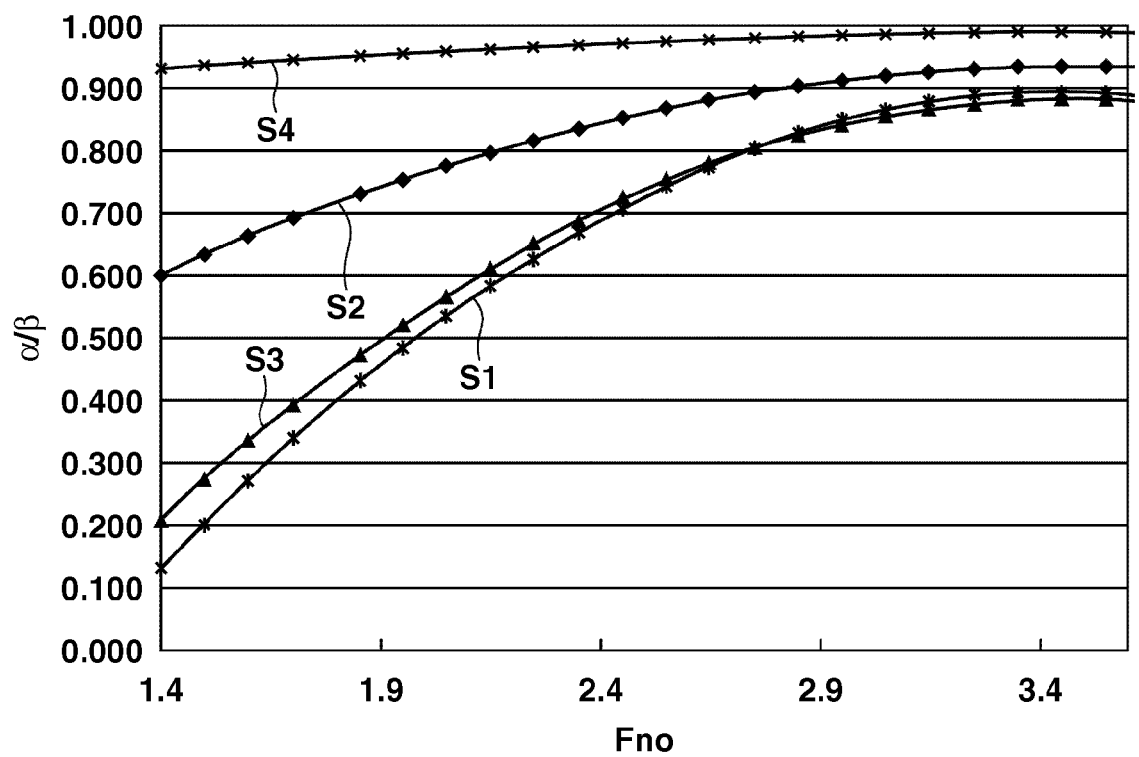
FIG. 15 illustrates an example of a more useful range of asymmetrical compression for each Fno in the illumination optical system according to the first exemplary embodiment of the present invention.

FIG. 15 illustrates curves S1-S4 which respectively indicate exemplary α/β maximum values $\gamma_1$–$\gamma_4$ for each Fno according to the present exemplary embodiment.

In order to achieve a higher effect of asymmetrically compressing of the light flux, it is more useful to set the value $\gamma_3$ greater than $\gamma_1$ toward $\gamma_2$ by a value 20%, and set the value $\gamma_4$ smaller than 1 toward $\gamma_2$ by a value 20%. That is, $\gamma_3=0.8\gamma_1+0.2\gamma_2$ and $\gamma_4=0.8+0.2\gamma_2$. $\gamma_3$ and $\gamma_4$ can be expressed as a function of Fno by the following expression:

$$\gamma_3=-0.159*(Fno)^2+1.101*(Fno)-1.006$$

$$\gamma_4=-0.011*(Fno)^2+0.082*(Fno)+0.837.$$

Therefore, since $\gamma_3 \leq \alpha/\beta < \gamma_4$, it is more useful if the light flux compression setting can satisfy the following expression:

$$-0.159*(Fno)^2+1.101*(Fno)-1.006 \leq \alpha/\beta \leq -0.011*(Fno)^2+0.082*(Fno)+0.837 \quad (1a).$$

More specifically, it is useful if α/β is greater than 0.5 and smaller than 0.95. It is more useful if α/β is greater than 0.6 and/or smaller than 0.92. It is even more useful if α/β is greater than 0.69 and/or smaller than 0.89.

Further, it is useful if the compression ratios α and β satisfy the following conditions:

$$1.05<\alpha$$

$$1.1<\beta.$$

It is more useful if the compression ratio α is greater than 1.11 and/or smaller than 1.5. It is even more useful if the compression ratio α is greater than 1.23 and/or smaller than 1.37. With respect to the compression ratio β, it is useful if the compression ratio β is greater than 1.30 and/or smaller than 2.30. It is even more useful if the compression ratio β is greater than 1.40 and/or smaller than 2.18.

In the present exemplary embodiment, only basic components of the illumination optical system are described. However, in an actual illumination optical system, various optical elements such as a folding mirror for folding the optical path of the light from the light source, a heat ray cut filter, and a polarization plate are disposed in addition.

Furthermore, in the present exemplary embodiment, one liquid crystal panel 8 is used. However, three liquid crystal panels corresponding to each of red, green and blue (R, G, B) color light are provided in an actual general projector. The polarizing beam splitter 7 constitutes a part of a color separating/combining optical system which guides the illumination light of each color of R, G, B to these three liquid crystal panels and combines each color image light from the three liquid crystal panels.

Now, a detailed configuration and a Numerical Example of the illumination optical system according to the first exemplary embodiment will be described.

NUMERICAL EXAMPLE 1

Figure 16A:
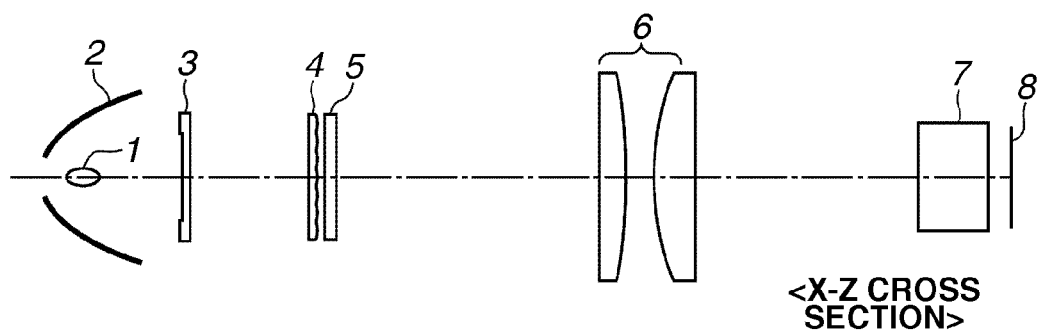
FIGS. 16A and 16B are cross sections each illustrating an exemplary configuration of Numerical Example 1 according to the first exemplary embodiment of the present invention.
Figure 16B:
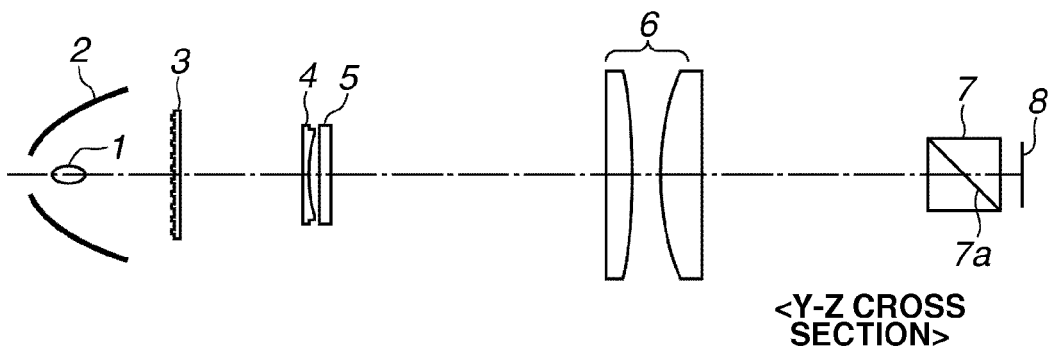

FIG. 16A is an X-Z cross section of the illumination optical system according to Numerical Example 1. FIG. 16B is a Y-Z cross section of the illumination optical system according to Numerical Example 1. In each of FIGS. 16A and 16B, components of the illumination optical system are the same as those illustrated in FIG. 1 and FIG. 2. This also applies to each of the following Numerical Examples.

Second focal length $f_2$ of the elliptical reflector=230 mm

Distance $L_1$ between the elliptical reflector and the first fly-eye lens=46 mm Distance $L_2$ between the elliptical reflector and the second fly-eye lens=87 mm where Focal length $f_{f1}$ in the case of the concave lens effect achieved by the decentering of the first fly-eye lens=−184 mm Focal length $f_{f2}$ in the case of the concave lens effect achieved by the decentering of the second fly-eye lens=−143 mm therefore $$\alpha=|f_2|/|f_{f1}|=1.25$$

$$\beta=|f_2|/|f_{f2}|=1.607$$

$$\alpha/\beta=0.78$$

where

Condenser lens Focal length $f_c$=100 mm

Width $D_2$ of the light flux incident on the polarization conversion element in the X-Z cross section=42.5 mm therefore $$Fno=f_c/D_2=2.35$$

where $\gamma_1=0.627$, $\gamma_3=0.703$, and $\gamma_4=0.969$.

Thus, the compression ratio $\alpha/\beta$ satisfies the following condition:

$$\gamma_1<\gamma_3<\alpha/\beta<\gamma_4<1.$$

Numerical Example 1 is a balanced design that highly considers the contrast.

NUMERICAL EXAMPLE 2

Figure 17A:
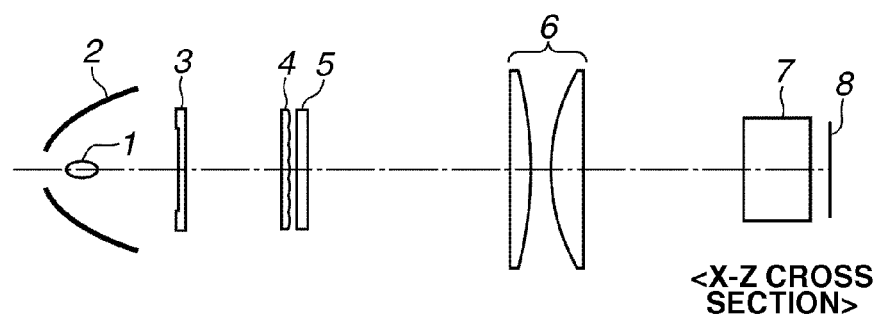
FIGS. 17A and 17B are cross sections each illustrating an exemplary configuration of Numerical Example 2 according to the first exemplary embodiment of the present invention.
Figure 17B:
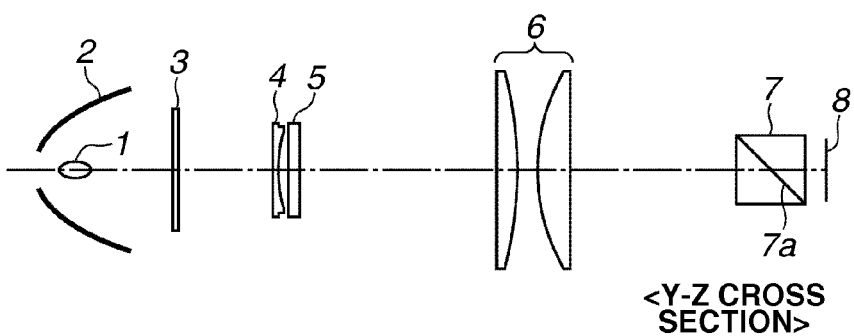

FIG. 17A is an X-Z cross section of the illumination optical system according to Numerical Example 2. FIG. 17B is a Y-Z cross section of the illumination optical system according to Numerical Example 2.

Second focal length $f_2$ of the elliptical reflector=230 mm

Distance $L_1$ between the elliptical reflector and the first fly-eye lens=46 mm Distance $L_2$ between the elliptical reflector and the second fly-eye lens=80.5 mm where Focal length $f_{f1}$ in the case of the concave lens effect achieved by the decentering of the first fly-eye lens=−184 mm Focal length $f_{f2}$ in the case of the concave lens effect achieved by the decentering of the second fly-eye lens=−149.5 mm therefore $$\alpha=|f_2|/|f_{f1}|=1.25$$

$$\beta=|f_2|/|f_{f2}|=1.538$$

$$\alpha/\beta=0.81$$

where

Condenser lens Focal length $f_c$=78.6 mm

Width $D_2$ of the light flux incident on the polarization conversion element in the X-Z cross section=42.5 mm therefore $$Fno=f_c/D_2=1.85$$

where $\gamma_1=0.427$, $\gamma_3=0.487$, and $\gamma_4=0.951$.

Thus, the compression ratio $\alpha/\beta$ satisfies the following condition:

$$\gamma_1<\gamma_3<\alpha/\beta<\gamma_4<1.$$

Numerical Example 2 is a design that emphasizes the brightness compared to the design of Numerical Example 1.

NUMERICAL EXAMPLE 3

Figure 18A:
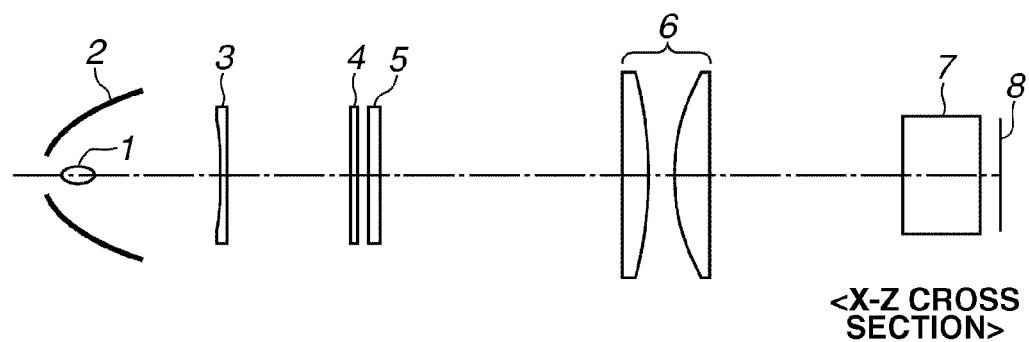
FIGS. 18A and 18B are cross sections each illustrating an exemplary configuration of Numerical Example 3 according to the first exemplary embodiment of the present invention.
Figure 18B:
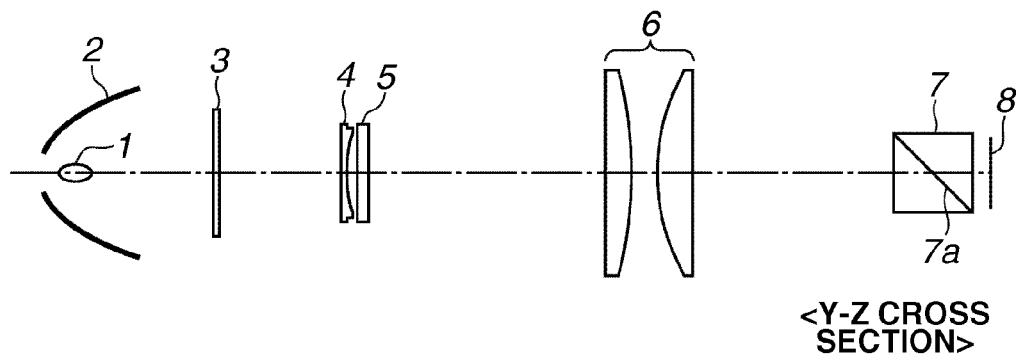

FIG. 18A is an X-Z cross section of the illumination optical system according to Numerical Example 3. FIG. 18B is a Y-Z cross section of the illumination optical system according to Numerical Example 3.

Second focal length $f_2$ of the elliptical reflector, $f_2$=182.4 mm

Distance $L_1$ between the elliptical reflector and the first fly-eye lens=45.6 mm Distance $L_2$ between the elliptical reflector and the second fly-eye lens=86.6 mm where Focal length $f_{f1}$ in the case of the concave lens effect achieved by the decentering of the first fly-eye lens=−136.8 mm Focal length $f_{f2}$ in the case of the concave lens effect achieved by the decentering of the second fly-eye lens=−95.7 mm therefore $$\alpha=|f_2|/|f_{f1}|=1.333$$

$$\beta=|f_2|/|f_{f2}|=1.906$$

$$\alpha/\beta=0.7$$

where

Condenser lens Focal length $f_c$=85 mm

Width $D_2$ of the light flux incident on the polarization conversion element in the X-Z cross section=40.5 mm therefore $$Fno=f_c/D_2=2.1$$

where $\gamma_1=0.561$, $\gamma_3=0.605$, and $\gamma_4=0.961$.

Thus, the compression ratio α/β satisfies the following condition:

$$\gamma_1 < \gamma_3 < \alpha/\beta < \gamma_4 < 1.$$

Numerical Example 3 is a balanced design that emphasizes the contrast more than the design of Numerical Example 2.

Second Exemplary Embodiment

Figure 19:
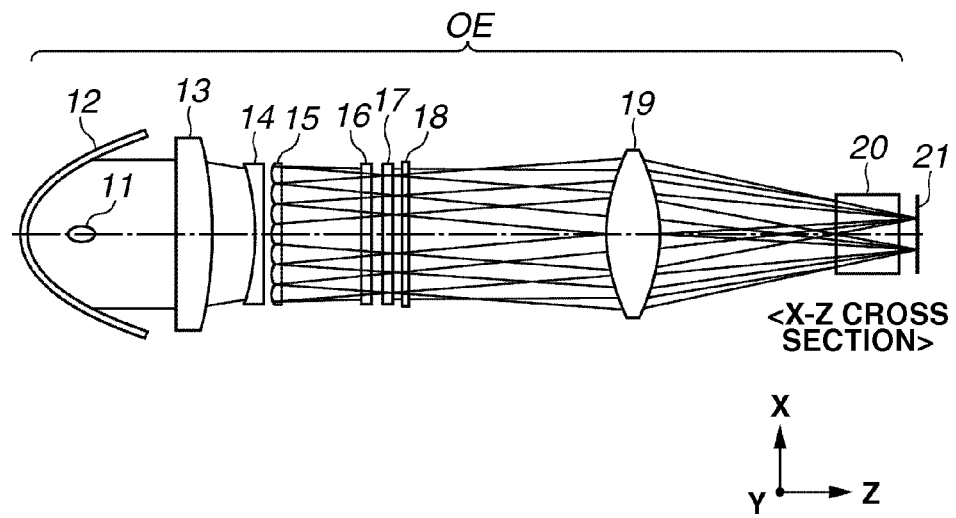
FIG. 19 is an X-Z cross section of an illumination optical system according to a second exemplary embodiment of the present invention.
Figure 20:
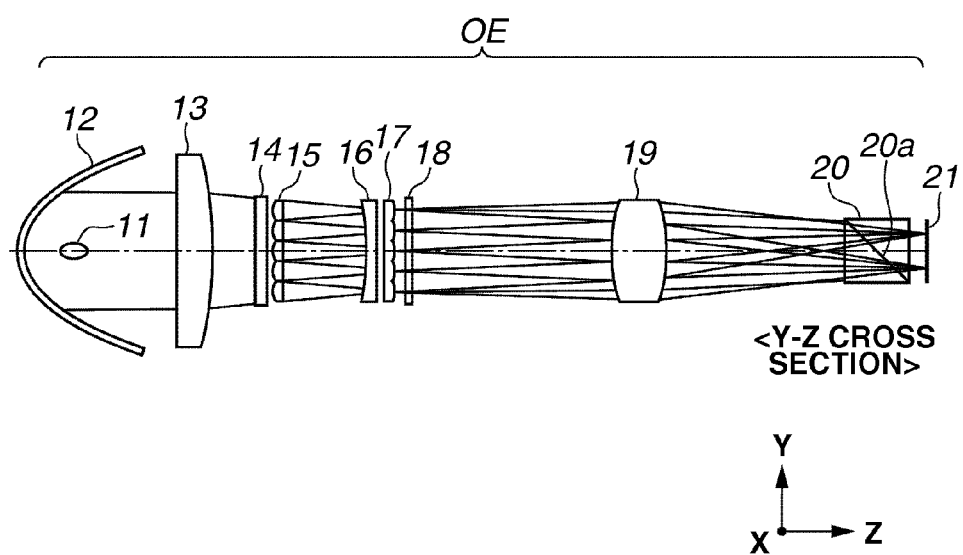
FIG. 20 is a Y-Z cross section of the illumination optical system according to the second exemplary embodiment of the present invention.

A second exemplary embodiment of the present invention is described next. FIG. 19 and FIG. 20 illustrate components of the illumination optical system OE according to the second exemplary embodiment of the present invention. The second exemplary embodiment of the present invention can achieve an optical effect similar to that achieved in the first exemplary embodiment.

More specifically, FIG. 19 is an X-Z cross section of the illumination optical system OE according to the present exemplary embodiment. The X-Z cross section illustrated in FIG. 19 is equivalent to that illustrated in FIG. 1. FIG. 20 is a Y-Z cross section of the illumination optical system OE according to the present exemplary embodiment. The Y-Z cross section illustrated in FIG. 20 is equivalent to that illustrated in FIG. 2. The present exemplary embodiment uses a compression optical system different from the first exemplary embodiment.

The present exemplary embodiment uses a positive lens (a convex lens) 13, which is a third optical element, and two negative cylindrical lenses (concave cylindrical lenses) 14 and 16 as the second optical elements 14 and 16 to compress a light flux from a parabolic reflector 12.

White light emitted from a light source unit 11 exits from the parabolic reflector 12 as a parallel light flux.

The parallel light flux is condensed by (is subjected to a light condensing effect of) the convex lens (the positive lens (the third optical element)) 13 having a positive refractive power of the same level in the X-Z cross section plane (the first cross section plane) and the Y-Z cross section plane (the second cross section plane). Note here that it is not necessary that the positive refractive power of the convex lens 13 is the same in the X-Z cross section plane and the Y-Z cross section plane. The light flux having exited from the convex lens 13 passes through the first concave cylindrical lens (the first optical element) 14 having a negative refractive power in the X-Z cross section plane. Then, the light flux is incident on a first fly-eye lens 15.

The light flux which has been incident on the first fly-eye lens 15 is then split into a plurality of light fluxes. Each split light flux is condensed by the first fly-eye lens 15. The light flux that has exited from the first fly-eye lens 15 is then incident on the second concave cylindrical lens (the second optical element) 16 having the negative refractive power in the Y-Z cross section plane.

After having passed through the second concave cylindrical lens 16, the light flux forms a plurality of secondary light source images on a light-incidence surface or a light-exiting surface of a polarization conversion element 18 or in the proximity thereof via a second fly-eye lens 17.

A plurality of split light fluxes (linear polarized light having a predetermined polarization direction) that has exited from the polarization conversion element 18 is condensed by a condenser lens 19. Then, the plurality of split light fluxes passes through a polarizing beam splitter 20 and is combined on a reflection-type liquid crystal panel 21.

A polarization splitting film 20a similar to that described in the first exemplary embodiment is provided to the polarizing beam splitter 20.

Each of the first and second fly-eye lenses 15 and 17 includes a plurality of lens cells arranged in a two-dimensional array.

Figure 21:
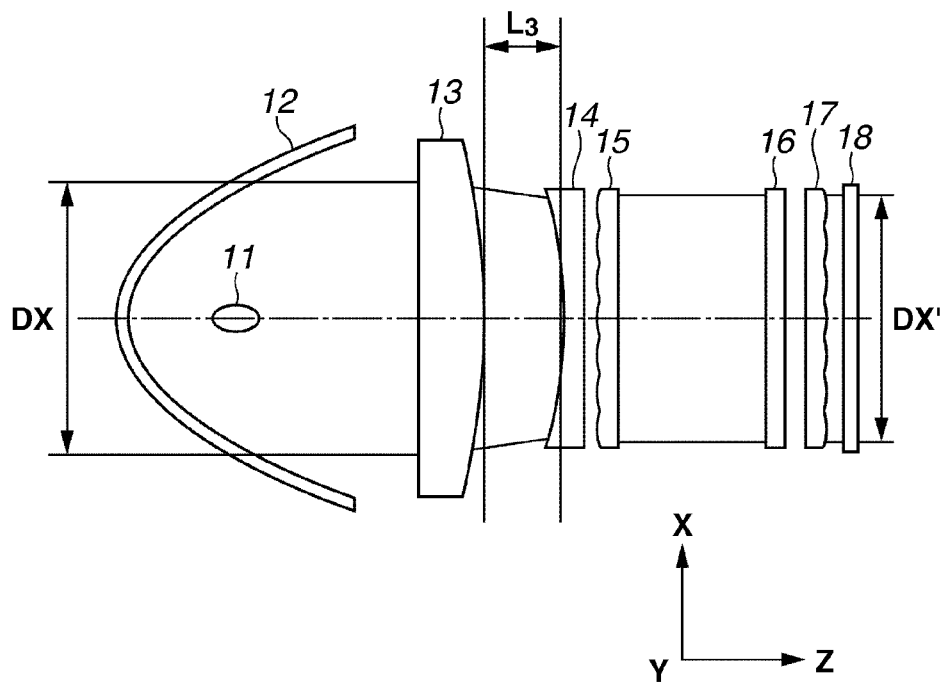
FIG. 21 is an enlarged view illustrating an optical path in the X-Z cross section from a reflector to a polarization conversion element according to the second exemplary embodiment of the present invention.
Figure 22:
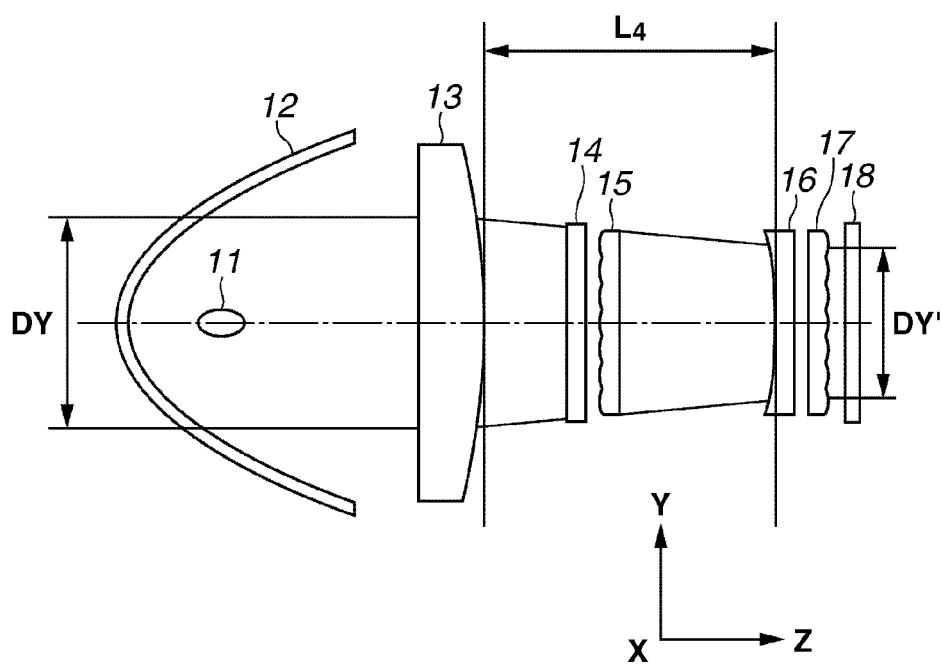
FIG. 22 is an enlarged view illustrating an optical path in the Y-Z cross section from the reflector to a polarization conversion element according to the second exemplary embodiment of the present invention.

Each of FIGS. 21 and 22 is an enlarged view illustrating the optical path with respect to the components (the parabolic reflector 12, the convex lens 13, the concave cylindrical lens 14, the first fly-eye lens 15, the second concave cylindrical lens 16, the second fly-eye lens 17, and the polarization conversion element 18 (FIGS. 19 and 20)) of the present exemplary embodiment.

The parallel light flux that has exited from the parabolic reflector 12 is converted by the convex lens 13 into a converged light flux. Then, the light flux is converted by the concave cylindrical lens 14 having the concave lens effect into a parallel light flux in the X-Z cross section plane (FIG. 21). On the other hand, the convergence light flux from the convex lens 13 is converted by the second concave cylindrical lens 16 having the concave lens effect into a parallel light flux in the Y-Z cross section plane (FIG. 22).

That is, in the example illustrated in FIG. 21, the light flux is compressed by the convex lens (the third optical element) 13 and the concave cylindrical lens (the first optical element) 14 in the X-Z cross section plane. On the other hand, in the example illustrated in FIG. 22, the light flux is compressed by the convex lens 13 and the second concave cylindrical lens (the second optical element) 16 in the Y-Z cross section plane.

The compression ratio α in the X-Z cross section plane and the compression ratio β in the Y-Z cross section plane can be calculated by the following expression:

$$\alpha = DX/DX'$$

$$\beta = DY/DY'$$

where "DX" denotes the width of the light flux in the X-Z cross section plane (FIG. 21) at the time the light flux exits from (is reflected by) the elliptical reflector 12, "DY" denotes the width of the light flux in the Y-Z cross section plane (FIG. 22) at the time the light flux exits from (is reflected by) the elliptical reflector 12, "DX'" denotes the width of the light flux in the X-Z cross section plane (FIG. 21) at the time the light flux is incident on the polarization conversion element 18, and "DY'" denotes the width of the light flux in the Y-Z cross section plane (FIG. 22) at the time the light flux is incident on the polarization conversion element 18.

In the present exemplary embodiment, the parallel light flux from the parabolic reflector 12 is incident on the convex lens 13, and the light flux that has exited from the concave cylindrical lens 14 and the second concave cylindrical lens 16 is incident on the polarization conversion element 18 as a parallel light flux. Therefore, the compression ratio can be determined according to a distance between the convex lens 13 and the concave cylindrical lens 14 or the second concave cylindrical lens 16 ("compression distance").

In the example illustrated in FIG. 21, the compression distance is equivalent to a distance $L_3$ in the X-Z cross section plane because the light flux is compressed by the convex lens 13 and the concave cylindrical lens 14. On the other hand, in the example illustrated in FIG. 22, the compression distance is equivalent to a distance $L_4$ in the Y-Z cross section plane because the light flux is compressed by the convex lens 13 and the second concave cylindrical lens 16. Accordingly, the present exemplary embodiment uses different light flux compression ratios for the X-Z cross section plane and the Y-Z cross section plane.

More specifically, the compression ratio α can be calculated by the following expression:

$$DX/DX' = |f_{convex}|/|f_{concave1}|$$

where "$f_{convex}$" denotes a focal length of the convex lens 13 and "$f_{concave1}$" denotes a focal length of the concave cylindrical lens 14 in the X-Z cross section plane.

Similarly, the compression ratio β can be calculated by the following expression:

$$DY/DY' = |f_{convex}|/|f_{concave2}|$$

where "$f_{concave2}$" denotes a focal length of the second concave cylindrical lens 16 in the Y-Z cross section plane.

Accordingly, the compression ratio α and the compression ratio β can be expressed as follows:

Compression ratio $\alpha = DX/DX' = |f_{convex}|/|f_{concave1}|$

Compression ratio $\beta = DY/DY' = |f_{convex}|/|f_{concave2}|$.

Further, the distances $L_3$ and $L_4$ can be expressed as follows:

$$L_3 = |f_{convex}| - |f_{concave1}|$$

$$L_4 = |f_{convex}| - |f_{concave2}|.$$

Since $L_3/L_4 < 1$, the light flux compression ratio β in the Y-Z cross section plane is greater than the light flux compression ratio α in the X-Z cross section plane. That is, $\alpha/\beta < 1$.

As described above, in the present exemplary embodiment, the parallel light flux that has exited from the parabolic reflector 12 is converted by the convex lens 13 into a convergence light flux. Thus, the present exemplary embodiment achieves a light flux compression ratio in the Y-Z cross section plane that is larger than in the X-Z cross section plane, by utilizing the difference in the distance between the convex lens 13, and the first and second concave cylindrical lenses 14 and 16. Accordingly, similar to the effect achieved by the first exemplary embodiment, the present exemplary embodiment can suppress the increase in the thickness of the first fly-eye lens 15 or the second fly-eye lens 17 and the decrease of the illumination efficiency of the illumination optical system OE, while achieving a sufficiently high light flux compression ratio in the Y-Z cross section plane.

In the present exemplary embodiment, the light flux angular distribution is smaller in the direction in which the polarizing beam splitter 20 is sensitive to the light flux angular distribution (in the direction of the Y-Z cross section) With this configuration, the present exemplary embodiment can suppress the uneven brightness of an image or the degradation of contrast of the image in projecting the image displayed on the liquid crystal panel onto the projection surface via the polarizing beam splitter 20. Accordingly, the present exemplary embodiment can project an image onto the projection surface (screen surface) with a high brightness and high contrast.

The only difference between the first and the second exemplary embodiments is that the compression optical system according to the second exemplary embodiment which determines the compression ratio α and the compression ratio β has a different configuration. Therefore, each conditional expression described in the first exemplary embodiment can also hold in the second exemplary embodiment.

The present exemplary embodiment uses a concave cylindrical lens (the concave cylindrical lens 14 and a second concave cylindrical lens 16) in addition to and separately from the fly-eye lenses (the first fly-eye lens 15 and the second fly-eye lens 17). However, the present invention is not limited to this embodiment. That is, as a modification to the present exemplary embodiment, the concave lens effect can be achieved by decentering the lens cell of the fly-eye lens, as in the first exemplary embodiment. In the case of providing the concave lens effect by decentering, the number of parts can be reduced. Thus, the illumination optical system can be easily assembled, which can decrease manufacturing cost.

Figure 32:
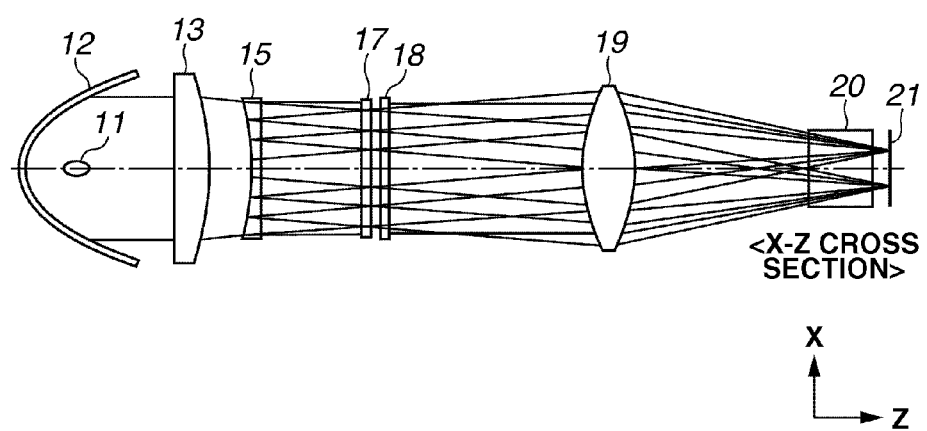
FIG. 32 is an X-Z cross section illustrating an example of a modification of the illumination optical system according to the second exemplary embodiment of the present invention.
Figure 33:
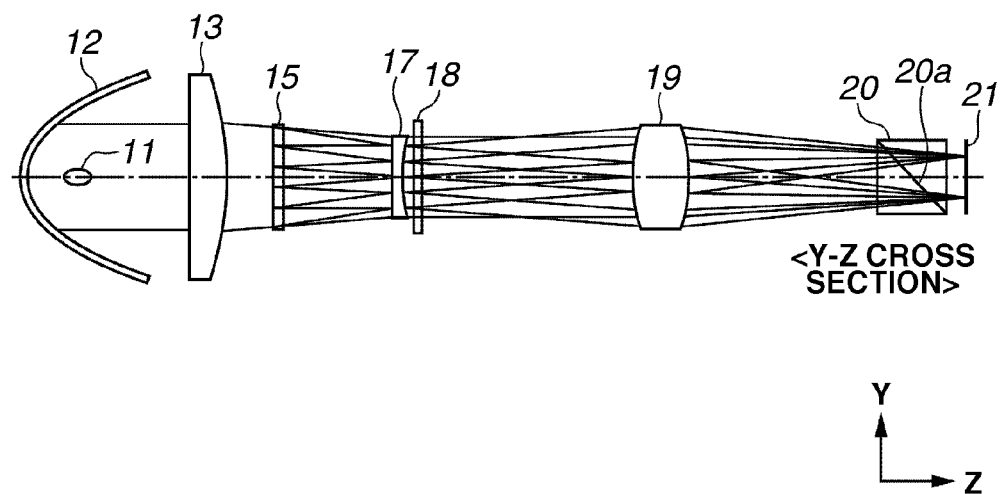
FIG. 33 is a Y-Z cross section illustrating an example of a modification of the illumination optical system according to the second exemplary embodiment of the present invention.

Each of FIGS. 32 and 33 illustrates components of the illumination optical system OE in the X-Z cross section plane and the Y-Z cross section plane when the configuration illustrated in FIGS. 19 and 20 according to the second exemplary embodiment of the present invention is partially modified.

In the example illustrated in FIG. 32 and FIG. 33, the illumination optical system OE does not include the concave cylindrical lens 14 and the second concave cylindrical lens 16 provided in the examples in FIG. 19 and FIG. 20 according to the second exemplary embodiment. Instead, in the example illustrated in FIG. 32, the illumination optical system OE obtains the concave lens effect by decentering the first fly-eye lens 15. Similarly, in the example illustrated in FIG. 33, the illumination optical system OE obtains the concave lens effect by decentering the second fly-eye lens 17.

It is also useful if a concave cylindrical surface is provided opposite to the lens cell surface of each of the first fly-eye lens 15 and the second fly-eye lens 17.

Now, a detailed configuration and a Numerical Example of the illumination optical system according to the second exemplary embodiment will be described below.

NUMERICAL EXAMPLE 4

Figure 23A:
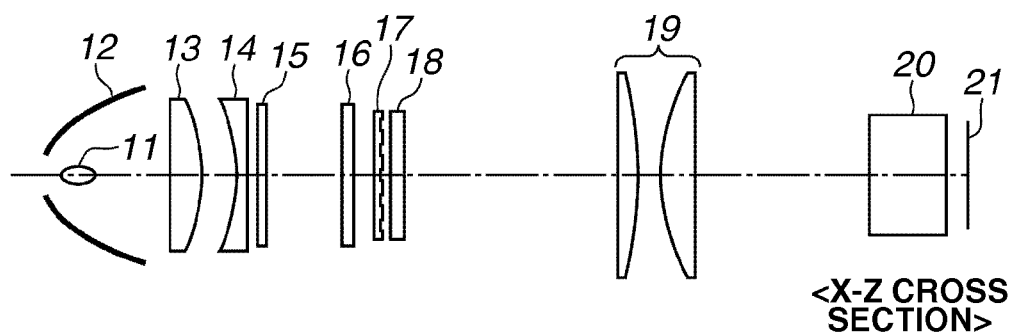
FIGS. 23A and 23B are cross sections each illustrating an exemplary configuration of Numerical Example 4 according to the second exemplary embodiment of the present invention.
Figure 23B:
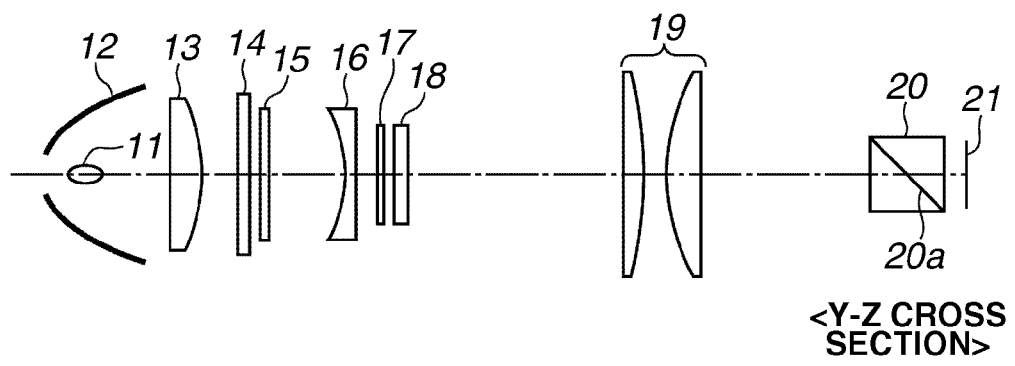

FIG. 23A is an X-Z cross section of the illumination optical system according to Numerical Example 4. FIG. 23B is a Y-Z cross section of the illumination optical system according to Numerical Example 4. In FIGS. 23A and 23B, components of the illumination optical system are the same as those illustrated in FIG. 1 and FIG. 2 in the first exemplary embodiment. This also applies to the following Numerical Examples of the second exemplary embodiment.

Distance $L_1$ between the convex lens and the first concave cylindrical lens=16.3 mm Distance $L_2$ between the convex lens and the second concave cylindrical lens=45.9 mm where Convex lens focal length $f_{convex}$=125 mm First concave cylindrical lens focal length $f_{concave1}$=−108.7 mm Second concave cylindrical lens focal length $f_{concave2}$=−82.8 mm therefore $\alpha = |f_{convex}|/|f_{concave1}| = 1.15$ $\beta = |f_{convex}|/|f_{concave2}| = 1.58$ $\alpha/\beta = 0.728$ where Condenser lens Focal length $f_c$=82 mm Width $D_6$ of the light flux incident on the polarization conversion element in the X-Z cross section=44.3 mm therefore $Fno = f_c/D_6 = 1.85$ where $\gamma_1 = 0.427$, $\gamma_3 = 0.487$, and $\gamma_4 = 0.951$.

Thus, the compression ratio $\alpha/\beta$ satisfies the following condition:

$$\gamma_1 < \gamma_3 < \alpha/\beta < \gamma_4 < 1.$$

Numerical Example 4 is a design that emphasizes the brightness compared to Numerical Example 1.

NUMERICAL EXAMPLE 5

Figure 24A:
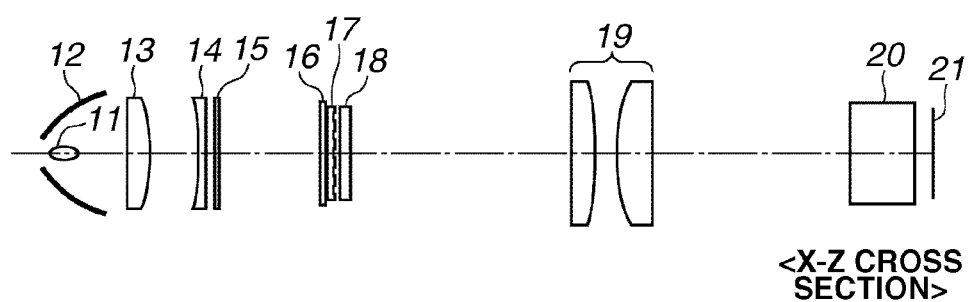
FIGS. 24A and 24B are cross sections each illustrating an exemplary configuration of Numerical Example 5 according to the second exemplary embodiment of the present invention.
Figure 24B:
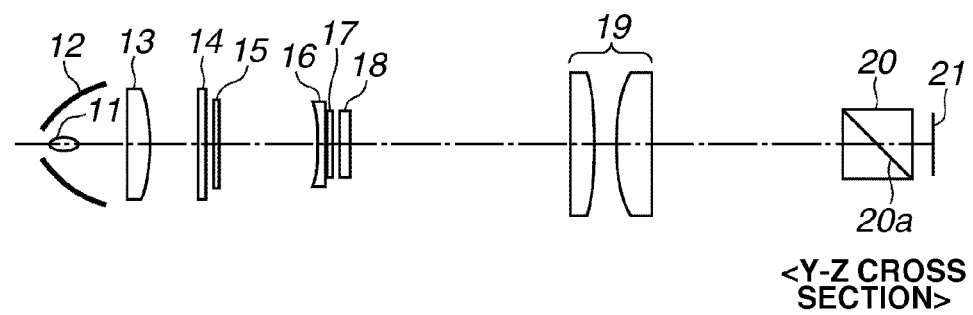

FIG. 24A is an X-Z cross section of the illumination optical system according to Numerical Example 5. FIG. 24B is a Y-Z cross section of the illumination optical system according to Numerical Example 5.

Distance $L_1$ between the convex lens and the first concave cylindrical lens=19.5 mm Distance $L_2$ between the convex lens and the second concave cylindrical lens=65.1 mm where Convex lens focal length $f_{convex}$=195 mm First concave cylindrical lens focal length $f_{concave1}$=−175.5 mm Second concave cylindrical lens focal length $f_{concave2}$=−129.9 mm therefore $$\alpha = |f_{convex}|/|f_{concave1}| = 1.111$$

$$\beta = |f_{convex}|/|f_{concave2}| = 1.502$$

$$\alpha/\beta = 0.74$$

where

Condenser lens Focal length $f_c$=115 mm

Width $D_6$ of the light flux incident on the polarization conversion element in the X-Z cross section=46.9 mm therefore $$Fno = f_c/D_6 = 2.45$$

where $\gamma_1$=0.71, $\gamma_3$=0.737, and $\gamma_4$=0.972.

Thus, the compression ratio $\alpha/\beta$ satisfies the following condition:

$$\gamma_1 < \gamma_3 < \alpha/\beta < \gamma_4 < 1.$$

Numerical Example 5 is a design that emphasizes the contrast compared to Numerical Example 1.

Third Exemplary Embodiment

Figure 25:
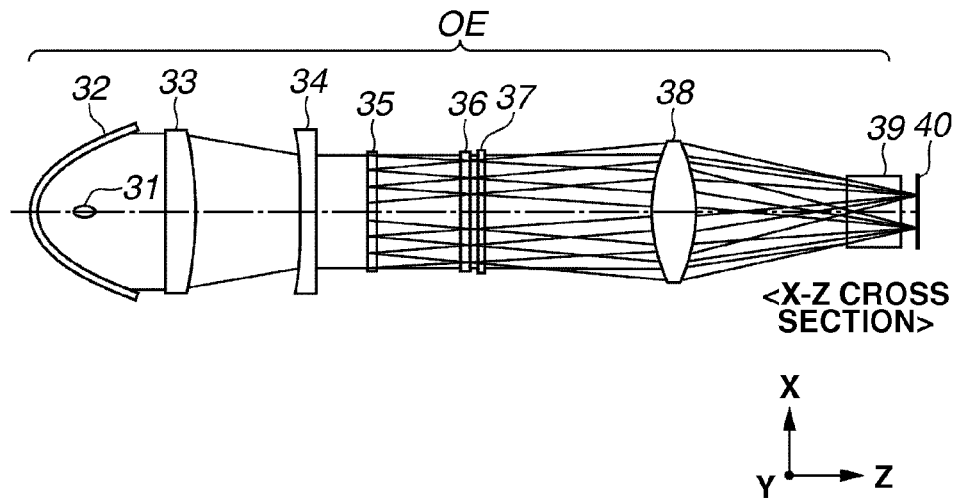
FIG. 25 is an X-Z cross section of an illumination optical system according to a third exemplary embodiment of the present invention.
Figure 26:
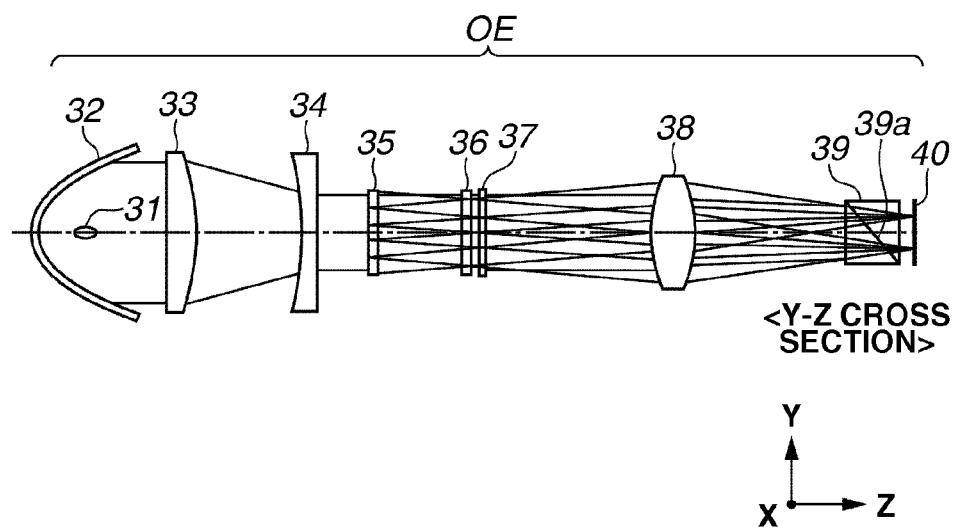
FIG. 26 is a Y-Z cross section of the illumination optical system according to the third exemplary embodiment of the present invention.

A third exemplary embodiment of the present invention is described below. FIG. 25 and FIG. 26 illustrate components of the illumination optical system OE according to the third exemplary embodiment of the present invention. The third exemplary embodiment of the present invention can achieve an optical effect similar to the first exemplary embodiment.

More specifically, FIG. 25 is an X-Z cross section of the illumination optical system OE according to the present exemplary embodiment. The X-Z cross section illustrated in FIG. 25 is equivalent to that illustrated in FIG. 1. FIG. 26 is a Y-Z cross section of the illumination optical system OE according to the present exemplary embodiment. The Y-Z cross section illustrated in FIG. 26 is equivalent to that illustrated in FIG. 2. The present exemplary embodiment uses a compression optical system different from those in the first and the second exemplary embodiments.

The present exemplary embodiment uses a toric lens 33 both of whose surfaces have a convex shape and a toric lens 34 both of whose surfaces have a concave shape to compress a light flux. A compression system of the present exemplary embodiment includes a fourth optical element 33 (the toric lens 33) having different positive refractive powers in the first and the second cross sections. Further, the compression system of the present exemplary embodiment includes a fifth optical element 34 (the toric lens 34) having different negative refractive powers in the first and the second cross sections. As described above, the fourth and the fifth optical elements are toric lenses.

White light emitted from a light source unit 31 exits from a parabolic reflector 32 as a parallel light flux.

The parallel light flux is converged by the double-convex toric lens 33 both of whose surfaces have a convex shape. Then, the converged light flux passes through the double-concave toric lens 34 and is then incident on a first fly-eye lens 35. The light flux that has been incident on the first fly-eye lens 35 is split into a plurality of light fluxes, and each split light flux is condensed by the first fly-eye lens 35. The light flux that has exited from the first fly-eye lens 35 forms a plurality of secondary light source images on a light-incidence surface or a light-exiting surface of a polarization conversion element 37 or in the proximity thereof via a second fly-eye lens 36.

The plurality of split light flux (linear polarized light having a predetermined polarization direction) that has exited from the polarization conversion element 37 is condensed by a condenser lens 38. Then, the plurality of split light fluxes passes through a polarizing beam splitter 39 and is combined on a reflection-type liquid crystal panel 40. A polarization splitting film 39a similar to that described in the first exemplary embodiment is provided in the polarizing beam splitter 39.

Each of the first and second fly-eye lenses 35 and 36 includes a plurality of lens cells arranged in a two-dimensional array.

Figure 27:
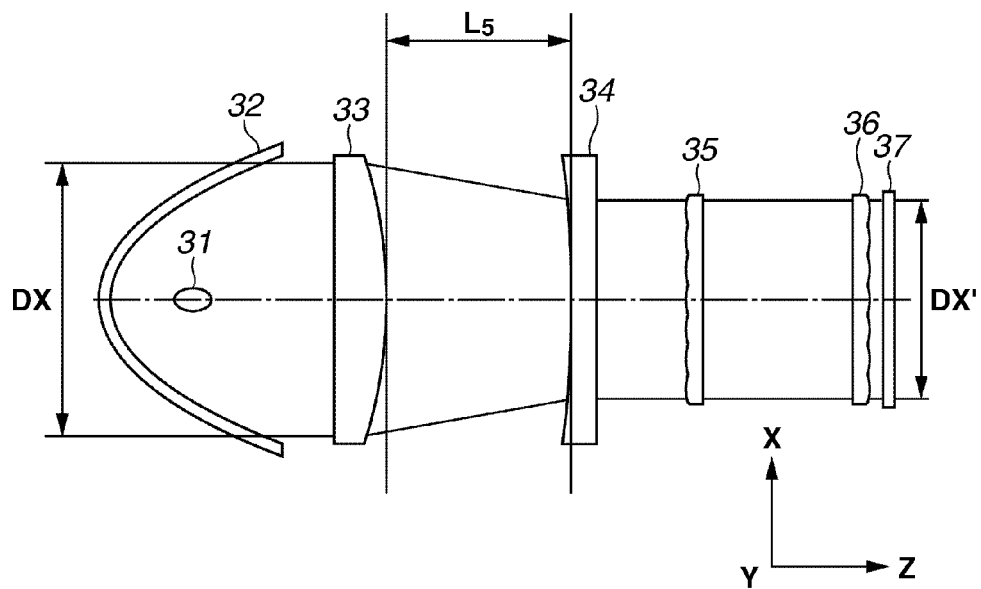
FIG. 27 is an enlarged view illustrating an optical path in the X-Z cross section from a reflector to a polarization conversion element according to the third exemplary embodiment of the present invention.
Figure 28:
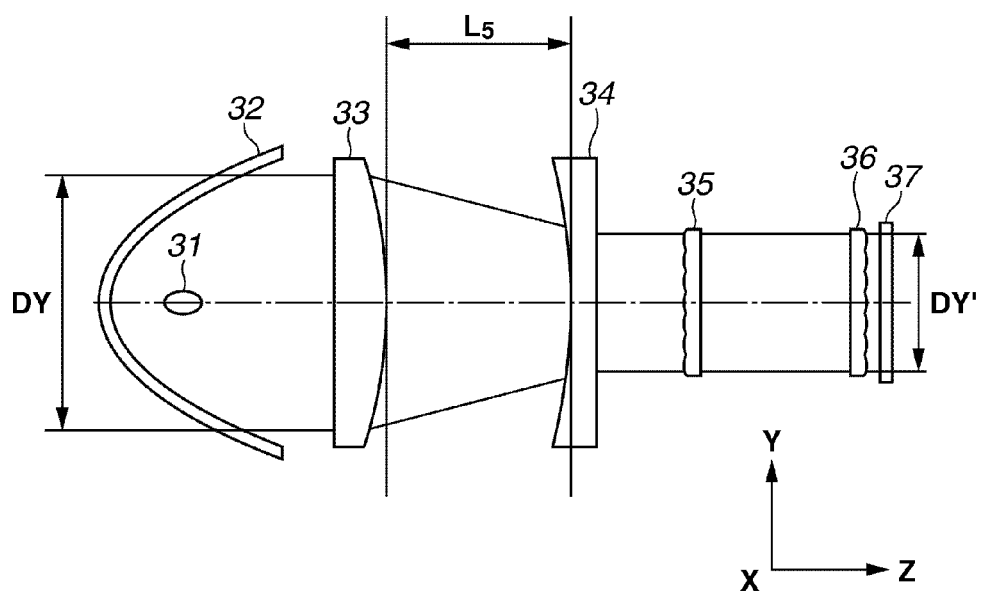
FIG. 28 is an enlarged view illustrating an optical path in the Y-Z cross section from the reflector to a polarization conversion element according to the third exemplary embodiment of the present invention.

FIGS. 27 and 28 are enlarged views illustrating the optical path with respect to the components (the parabolic reflector 32, the toric lens 33, the toric lens 34, the first fly-eye lens 35, and the second fly-eye lens 37 (FIGS. 25 and 26)) of the present exemplary embodiment.

The converged light flux that has passed through the double-convex toric lens 33 is then converted by the double-concave toric lens 34 having the concave lens effect in the X-Z cross section plane and the Y-Z cross section plane into a parallel light flux. That is, in both the X-Z cross section and the Y-Z cross section planes, the double-convex toric lens 33 and the double-concave toric lens 34 compress the light flux.

Here, the compression ratio $\alpha$ in the X-Z cross section plane and the compression ratio $\beta$ in the Y-Z cross section plane can be calculated by the following expression:

$$\alpha = DX/DX'$$

$$\beta = DY/DY'$$

where "DX" denotes the width of the light flux in the X-Z cross section plane (FIG. 27) at the time the light flux exits from (is reflected by) the elliptical reflector 32, "DY" denotes the width of the light flux in the Y-Z cross section plane (FIG. 28) at the time the light flux exits from (is reflected by) the elliptical reflector 32, "DX'" denotes the width of the light flux in the X-Z cross section plane (FIG. 27) at the time the light flux is incident on the polarization conversion element 37, and "DY'" denotes the width of the light flux in the Y-Z cross section plane (FIG. 28) at the time the light flux is incident on the polarization conversion element 37.

In the present exemplary embodiment, the parallel light flux from the parabolic reflector 32 is incident on the double-convex toric lens 33, and the light flux that has exited from the double-concave toric lens 34 is incident on the polarization conversion element 37 as a parallel light flux. Therefore, the compression ratio α and the compression ratio β can be determined according to a distance between the double-convex toric lens 33 and the double-concave toric lens 34 ("compression distance").

More specifically, the compression ratio α can be calculated by the following expression:

$$DX/DX'=|T1x|/|T2X|$$

where "$T1x$" denotes a focal length of the double-convex toric lens 33 and "T2X" denotes a focal length of the double-concave toric lens 34 in the X-Z cross section plane. Similarly, the compression ratio β can be calculated by the following expression:

$$DY/DY'=|T1y|/|T2y|$$

where "$T1y$" denotes a focal length of the double-convex toric lens 33 in the Y-Z cross section plane and "$T2y$" denotes a focal length of the double-concave toric lens 34 in the Y-Z cross section plane.

Accordingly, the compression ratio α and the compression ratio β can be expressed as follows:

Compression ratio $\alpha=DX/DX'=|T1x|/|T2x|$

Compression ratio $\beta=DY/DY'=|T1y|/|T2y|$.

Further, the focal lengths of the double-convex toric lens 33 and the double-concave toric lens 34 have a relationship expressed by the following expressions:

$$T1x/T2x>1$$

$$T1y/T2y>1$$

$$T1x/T1y>1$$

$$T2x/T2y>1.$$

Therefore, the light flux compression ratio β in the Y-Z cross section plane is greater than the light flux compression ratio α in the X-Z cross section plane. Although a distance $L_5$, which is a distance between the double-convex toric lens 33 and the double-concave toric lens 34 is the same in the X-Z cross section plane and the Y-Z cross section plane, the compression ratio differs for the X-Z cross section plane and the Y-Z cross section plane according to the focal length in the respective cross section planes.

As described above, in the present exemplary embodiment, the parallel light flux that has exited from the parabolic reflector 32 is converted by the double-convex toric lens 33 into a converged light flux. Thus, the present exemplary embodiment achieves a light flux compression ratio that is larger in the Y-Z cross section plane than in the X-Z cross section plane utilizing the difference between the focal length of the double-convex toric lens 33 and the double-concave toric lens 34 in the X-Z cross section and in the Y-Z cross section planes. Accordingly, similar to the effect achieved by the first exemplary embodiment, the present exemplary embodiment can suppress the increase in the thickness of the first fly-eye lens 35 or the second fly-eye lens 36 and the decrease of the illumination efficiency of the illumination optical system OE, while achieving a sufficiently high light flux compression ratio in the Y-Z cross section plane.

In the present exemplary embodiment, the light flux angular distribution is smaller in the direction in which the polarizing beam splitter 39 is sensitive to the light flux angular distribution (in the direction of the Y-Z cross section) With this configuration, the present exemplary embodiment can suppress the uneven brightness of an image or the degradation of contrast of the image in projecting the image displayed on the liquid crystal panel onto the projection surface via the polarizing beam splitter 39. Accordingly, the present exemplary embodiment can project an image onto the projection surface (screen surface) with a high brightness and high contrast.

Similarly to the second exemplary embodiment, the only difference between the first and the third exemplary embodiments is that the compression optical system according to the third exemplary embodiment which determines the compression ratio α and the compression ratio β has a different configuration. Therefore, each conditional expression described in the first exemplary embodiment can also hold in the third exemplary embodiment.

A detailed configuration and a Numerical Example of the illumination optical system according to the third exemplary embodiment will now be described.

NUMERICAL EXAMPLE 6

Figure 29A:
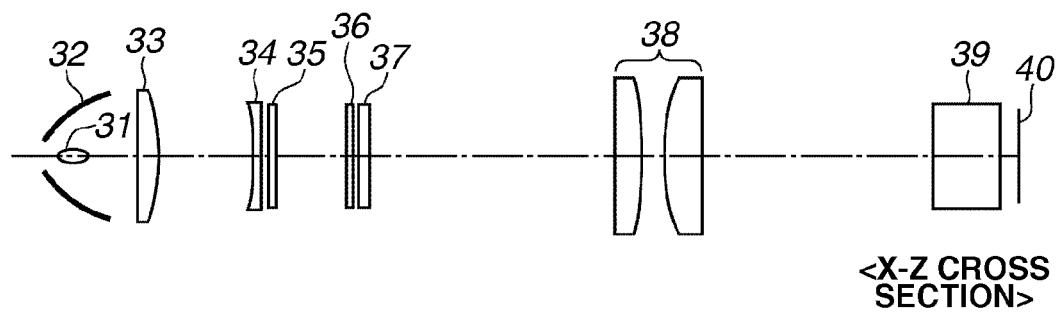
FIGS. 29A and 29B are cross sections each illustrating an exemplary configuration of Numerical Example 6 according to the third exemplary embodiment of the present invention.
Figure 29B:
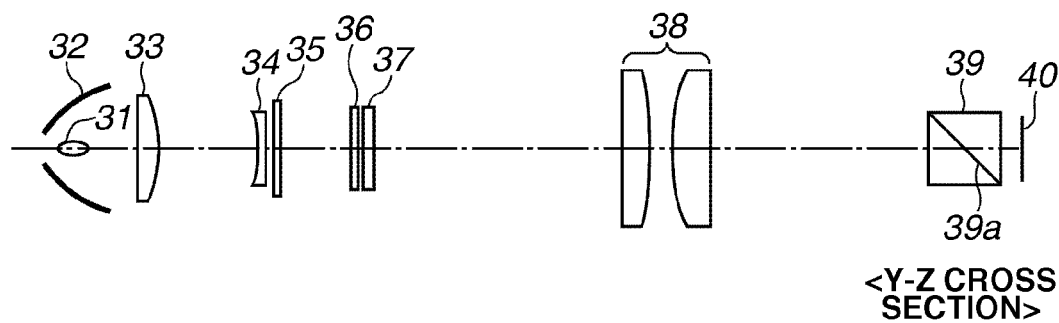

FIG. 29A is an X-Z cross section of the illumination optical system according to Numerical Example 6. FIG. 29B is a Y-Z cross section of the illumination optical system according to Numerical Example 6. In FIGS. 29A and 29B, components of the illumination optical system are the same as those illustrated in FIG. 1 and FIG. 2 in the first exemplary embodiment. This also applies to the following Numerical Examples of the third exemplary embodiment.

Distance between the toric lenses $L_5=40$ mm

Focal length of the double-convex toric lens in the X-Z cross section plane $T1x=200$ mm Focal length of the double-convex toric lens in the Y-Z cross section plane $T1y=135.1$ mm Focal length of the double-concave toric lens in the X-Z cross section plane $T2x=160$ mm Focal length of the double-concave toric lens in the Y-Z cross section plane $T2y=95.1$ mm therefore $$\alpha=|T1x|/|T2x|=1.25$$

$$\beta=|T1y|/|T2y|=1.42$$

$$\alpha/\beta=0.88$$

where

Condenser lens Focal length $f_c=119$ mm

Width $D_{10}$ of the light flux incident on the polarization conversion element in the X-Z cross section plane=43.3 mm therefore $$Fno=f_c/D_{10}=2.75$$

where $\gamma_1=0.803, \gamma_3=0.819,$ and $\gamma_4=0.979$.

Thus, the compression ratio α/β satisfies the following condition:

$$\gamma_1<\gamma_3<\alpha/\beta<\gamma_4<1.$$

Numerical Example 6 is a design that emphasizes the contrast compared to Numerical Example 1.

NUMERICAL EXAMPLE 7

Figure 30A:
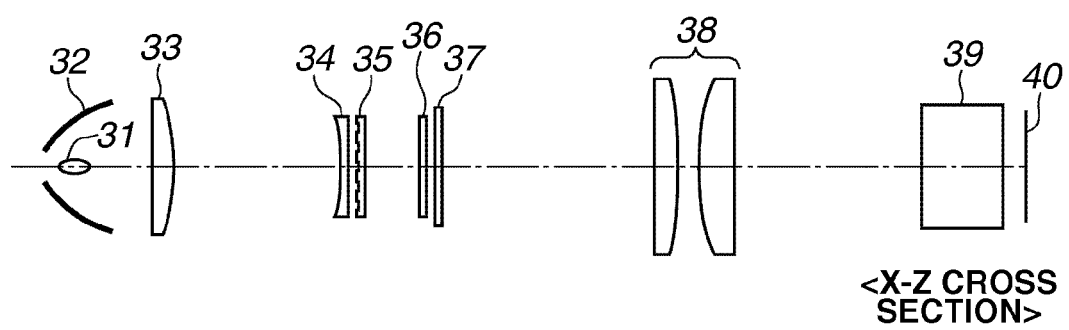
FIGS. 30A and 30B are cross sections each illustrating an exemplary configuration of Numerical Example 7 according to the third exemplary embodiment of the present invention.
Figure 30B:
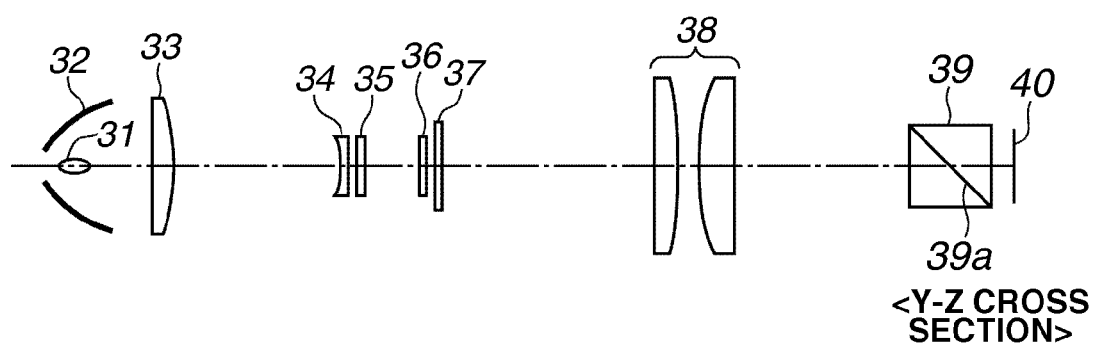

FIG. 30A is an X-Z cross section of the illumination optical system according to Numerical Example 7. FIG. 30B is a Y-Z cross section of the illumination optical system according to Numerical Example 7.

Distance between the toric lenses $L_5$=60 mm

Focal length of the double-convex toric lens in the X-Z cross section plane $T1x$=240 mm Focal length of the double-convex toric lens in the Y-Z cross section plane $T1y$=112.1 mm Focal length of the double-concave toric lens in the X-Z cross section plane $T2x$=180 mm Focal length of the double-concave toric lens in the Y-Z cross section plane $T2y$=52.1 mm therefore $$\alpha=|T1x|/|T2x|=1.333$$

$$\beta=|T1y|/|T2y|=2.15$$

$$\alpha/\beta=0.62$$

Further,

Condenser lens Focal length $f_c$=85 mm

Width $D_{10}$ of the light flux incident on the polarization conversion element in the X-Z cross section plane=40.6 mm therefore $$Fno=f_c/D_{10}=2.1$$

where $\gamma_1$=0.561, $\gamma_3$=0.605, and $\gamma_4$=0.961.

Thus, the compression ratio $\alpha/\beta$ satisfies the following condition:

$$\gamma_1<\gamma_3<\alpha/\beta<\gamma_4<1.$$

Numerical Example 7 is a design considering the balance between the brightness and the contrast.

With the above-described configuration, the present exemplary embodiment can achieve an illumination optical system that illuminates the image display element with an even brightness at a high brightness level, whose light flux angular distribution is smaller in the plane in which the optical element is sensitive to the light flux angular distribution. Further, with the above-described configuration, the present exemplary embodiment can achieve a projection-type display apparatus that projects an image with a high brightness and a high contrast using the above-described illumination optical system.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-167476 filed Jun. 26, 2007, which is hereby incorporated by reference herein in its entirety.

What is claimed is:

1. An illumination optical system configured to guide a light flux from a light source unit onto an illuminated surface, the illumination optical system comprising:

a compression system configured to compress the light flux emitted from the light source unit at a different compression ratio in a first cross section plane and a second cross section plane which are orthogonal to each other, and which both include an optical axis of the illumination optical system; and a polarized light splitting unit including a polarization splitting surface, wherein the second cross section plane is a plane including both the normal to the polarization splitting surface, and wherein the following conditions are satisfied:

$$-0.18*(Fno)^2+1.245*(Fno)-1.260<\alpha/\beta<1$$
$$1.4\leq Fno\leq 3.6,$$

where $\alpha$ and $\beta$ are compression ratios for compressing a light flux in the first cross section plane and in the second cross section plane respectively, and Fno is the smaller of the two F numbers calculated according to a maximum angle of a light flux incident on an illuminated surface in the first and the second cross section planes.

2. The illumination optical system according to claim 1, further comprising:

a polarization conversion element configured to unify polarization states of light fluxes from the compression system; and a condenser lens configured to condense the light fluxes from the polarization conversion element and guide the light fluxes onto the illuminated surface, wherein the polarization splitting surface is disposed between the condenser lens and the illuminated surface.

3. The illumination optical system according to claim 2, wherein the compression system causes the light flux emitted from the light source unit to be incident on the polarization conversion element as a parallel light flux.

4. The illumination optical system according to claim 1, wherein the compression system includes:

a first optical element having a negative refractive power in either one of the first cross section plane and the second cross section plane; and a second optical element having a negative refractive power different from the refractive power of the first optical element in the other cross section plane.

5. The illumination optical system according to claim 4, wherein each of the first and the second optical elements includes a lens array having a plurality of lens cells, and wherein a part of the plurality of lens cells is decentered.

6. The illumination optical system according to claim 1, wherein the compression system includes, in order from the light source unit:

a first optical element having the same positive refractive power in both the first and the second cross section planes;

a second optical element having a negative refractive power in either one of the first cross section plane and the second cross section plane; and a third optical element having a negative refractive power different from the refractive power of the second optical element in the other cross section plane.

7. The illumination optical system according to claim 1, wherein the compression system further includes:

a fourth optical element having different positive refractive power in the first and the second cross section planes, and a fifth optical element having different negative refractive power in the first and the second cross section planes.

8. The illumination optical system according to claim 7, wherein each of the fourth and the fifth optical elements is a toric lens.

9. The illumination optical system according to claim 1, wherein the compression ratios α and β satisfy the following conditions:

$$1.05 < \alpha \text{ and}$$

$$1.1 < \beta.$$

10. A projection-type display apparatus comprising:
an image display element;
an illumination optical system configured to guide a light flux from a light source unit onto an illuminated surface, the illumination optical system comprising:
a compression system configured to compress the light flux emitted from the light source unit at a different compression ratio in a first cross section plane and a second cross section plane which are orthogonal to each other, and which both include an optical axis of the illumination optical system; and
a polarized light splitting unit including a polarization splitting surface, wherein
the second cross section plane is a plane including both the normal to the polarization splitting surface, and
wherein the following conditions are satisfied:

$$-0.18*(Fno)^2 + 1.245*(Fno) - 1.260 < \alpha/\beta < 1$$
$$1.4 \leq Fno \leq 3.6,$$

where α and β are compression ratios for compressing a light flux in the first cross section plane and in the second cross section plane respectively, and Fno is the smaller of the two F numbers calculated according to a maximum angle of a light flux incident on an illuminated surface in the first and the second cross section planes, the illumination optical system being configured to illuminate the image display element; and
a projection optical system configured to project an image light from the image display element.

* * * * *